(12) United States Patent
Go et al.

(10) Patent No.: US 11,595,172 B2
(45) Date of Patent: Feb. 28, 2023

(54) METHOD AND DEVICE FOR TRANSMITTING AND RECEIVING SOUNDING REFERENCE SIGNAL IN WIRELESS COMMUNICATION SYSTEM

(71) Applicant: LG ELECTRONICS INC., Seoul (KR)

(72) Inventors: Seongwon Go, Seoul (KR); Jonghyun Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/710,000

(22) Filed: Mar. 31, 2022

(65) Prior Publication Data
US 2022/0231812 A1    Jul. 21, 2022

Related U.S. Application Data

(63) Continuation of application No. PCT/KR2020/013518, filed on Oct. 5, 2020.
(Continued)

(51) Int. Cl.
*H04W 4/00* (2018.01)
*H04L 5/00* (2006.01)
(Continued)

(52) U.S. Cl.
CPC ........... *H04L 5/0048* (2013.01); *H04W 52/14* (2013.01); *H04W 52/365* (2013.01); *H04W 72/1289* (2013.01)

(58) Field of Classification Search
CPC .............. H04W 80/02; H04W 52/365; H04W 72/0453; H04W 52/146; H04W 72/1268; H04W 24/10
(Continued)

(56) References Cited

U.S. PATENT DOCUMENTS 9,913,255 B2 *   3/2018   Wu ................. H04W 72/12
10,219,255 B2 *   2/2019   Wu ................. H04W 72/0406
(Continued)

FOREIGN PATENT DOCUMENTS

AU     2009280498 A1 *   2/2011   ......... H04J 11/0069
CN       107996030 A  *   5/2018   ......... H04L 25/0226
(Continued)

OTHER PUBLICATIONS

Ericsson, "Miscellaneous non-controversial corrections Set III," R2-1911868, Presented at 3GPP TSG-RAN2 Meeting #107, Prague, Czech Republic, Aug. 26-30, 2019, 510 pages.
(Continued)

*Primary Examiner* — David Q Nguyen
(74) *Attorney, Agent, or Firm* — Fish & Richardson P.C.

(57) ABSTRACT

A method for a terminal to transmit a Sounding Reference Signal (SRS) in a wireless communication system according to an embodiment includes the steps of: receiving setting information about an SRS; transmitting a message including information about Power Headroom (PH) related to the transmission power of the SRS; receiving Downlink Control Information (DCI) for triggering the transmission of the SRS; and transmitting the SRS. The PH is characterized by being related to a Power Headroom Report (PHR) of a specific type, wherein the specific type is based on the type of the PHR for a serving cell in which a Physical Uplink Shared Channel (PUSCH) and a Physical Uplink Control Channel (PUCCH) are not set.

13 Claims, 21 Drawing Sheets

Related U.S. Application Data

(60) Provisional application No. 62/909,739, filed on Oct. 2, 2019.

(51) Int. Cl.
*H04W 52/14* (2009.01)
*H04W 52/36* (2009.01)
*H04W 72/12* (2023.01)

(58) Field of Classification Search
USPC .......................................... 370/328, 329, 330
See application file for complete search history.

(56) References Cited

U.S. PATENT DOCUMENTS

| | | | |
|---|---|---|---|
| 2016/0014753 A1* | 1/2016 | Wu ...................... | H04L 1/1812 370/280 |
| 2018/0146470 A1* | 5/2018 | Wu ...................... | H04L 5/0053 |
| 2019/0044678 A1 | 2/2019 | Liu et al. | |
| 2019/0394732 A1* | 12/2019 | Loehr ................. | H04L 25/0224 |
| 2021/0045070 A1* | 2/2021 | Yi ....................... | H04W 52/383 |

FOREIGN PATENT DOCUMENTS

| | | | | |
|---|---|---|---|---|
| CN | 109788541 A | * | 5/2019 | |
| CN | 111903159 A | * | 11/2020 | ............. H04L 5/001 |
| JP | 2017188913 A | * | 10/2017 | ........... H04L 5/0053 |
| KR | 20160114685 | | 10/2016 | |

OTHER PUBLICATIONS

International Search Report in International Appln. No. PCT/KR2020/013518, dated Jan. 20, 2021, 4 pages (with English translation).

Lenovo & Motorola Mobility, "Discussion of additional SRS symbols," RI-1908719, Presented at 3GPP TSG RAN WG1 Meeting #98, Prague, CZ, Aug. 26-30, 2019, 8 pages.

Qualcomm Incorporated, "Additional SRS symbols," R1-1908840, Presented at 3GPP TSG-RAN WG1 #98, Prague, CZ, Aug. 26-30, 2019, 10 pages.

Ericsson, "Running MAC CR for NR-U," R2-1911557, Presented at 3GPP TSG-RAN2 # 107, Prague, Czech Republic, Aug. 26-30, 2019, 80 pages.

Huawei & HiSilicon, "Correction on PHR in EN-DC/NE-DC/NR-CA," RI-1909837, 3GPP TSG-RAN WG1 Meeting #98, Prague, Czech Republic, Aug. 26-30, 2019, 4 pages.

Office Action in Korean Appln. No. 10-2022-7004815, dated Sep. 7, 2022, 11 pages (with English translation).

* cited by examiner

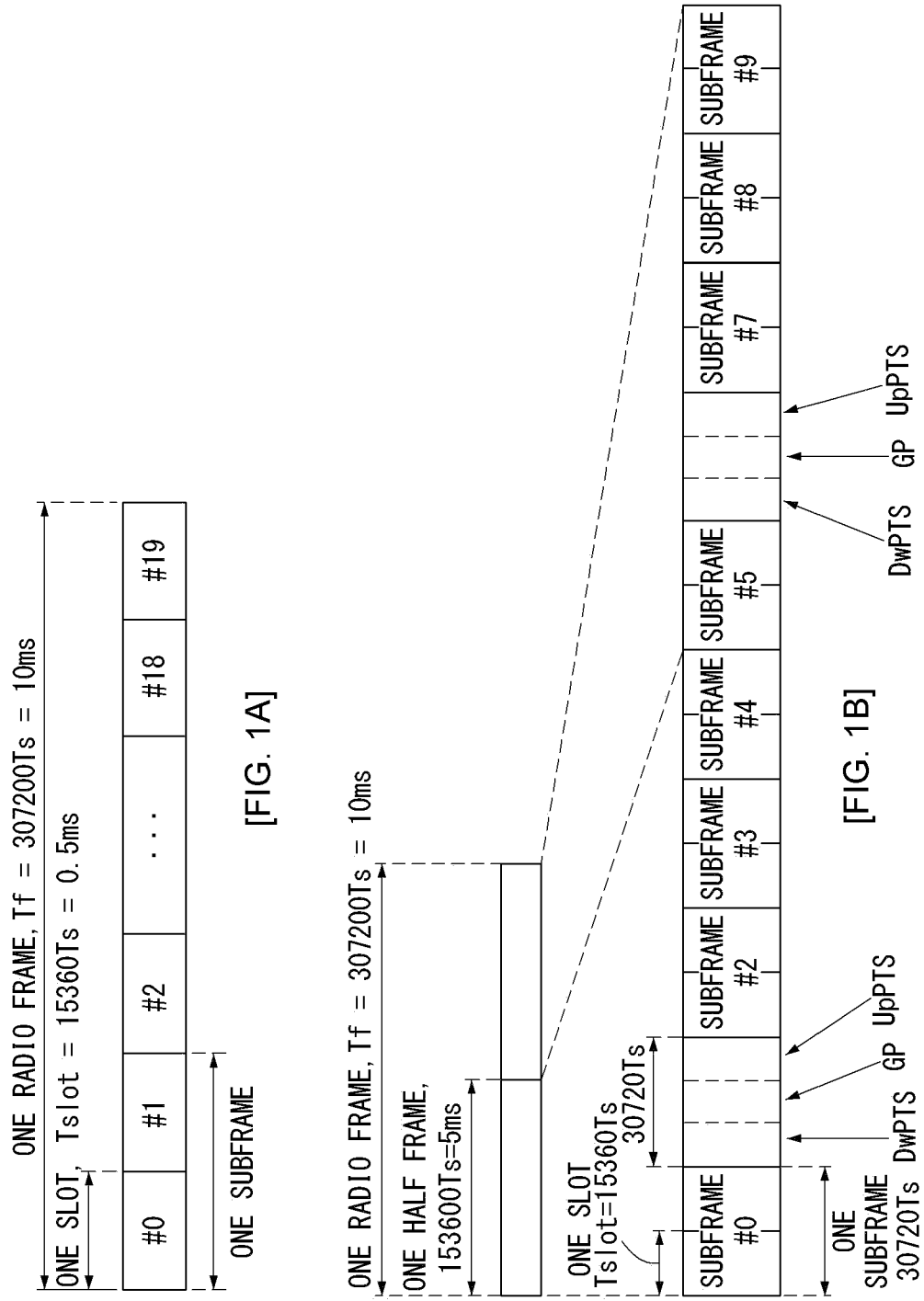

[FIG. 2]
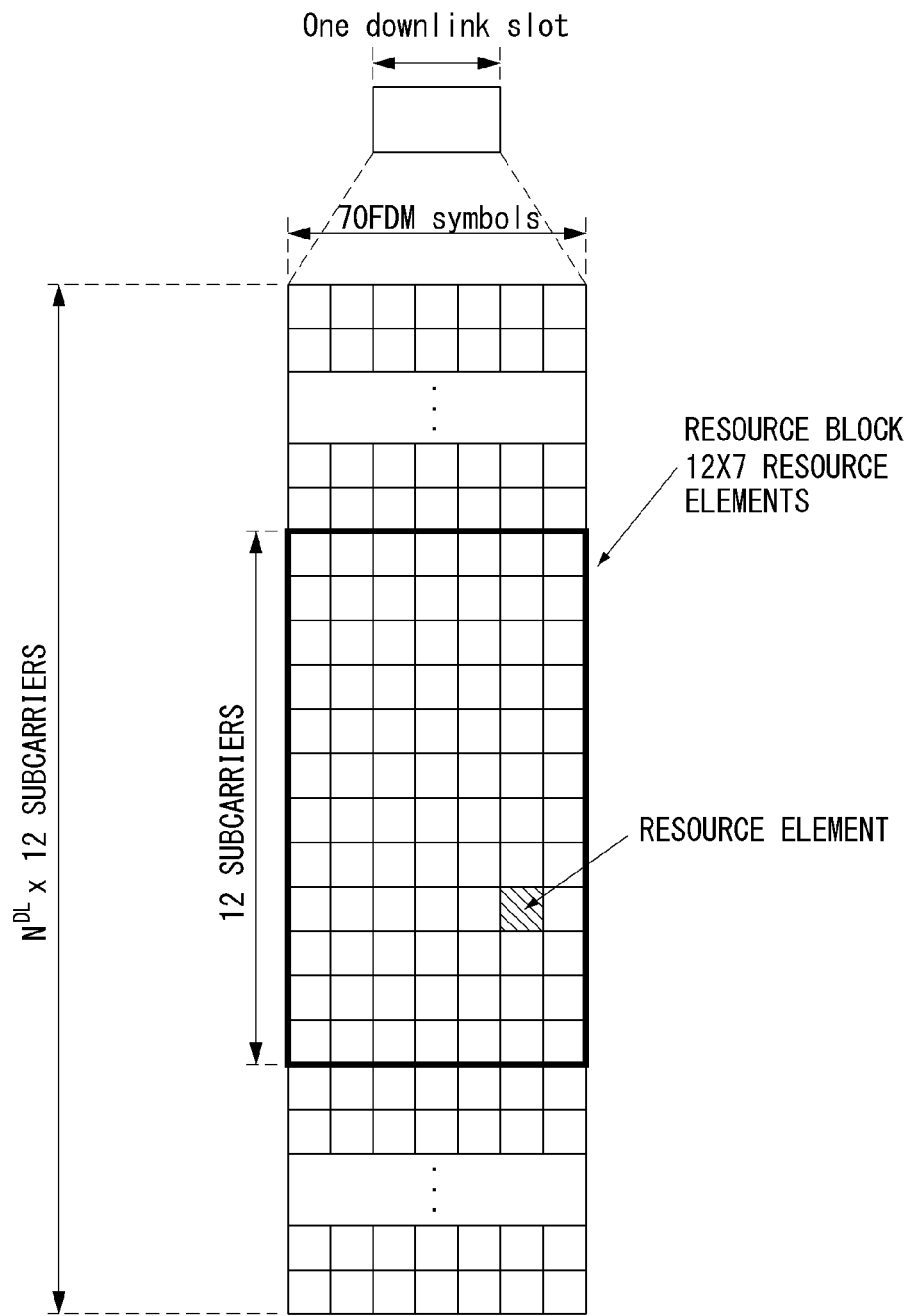

[FIG. 3]
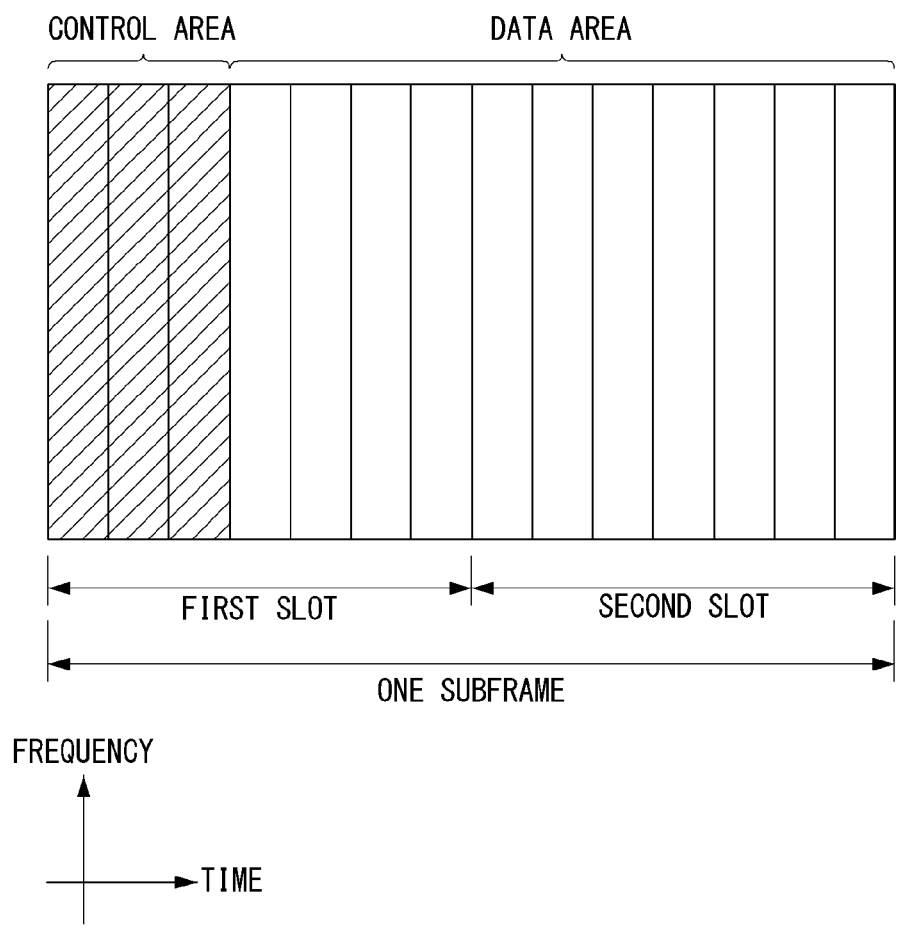

[FIG. 4]
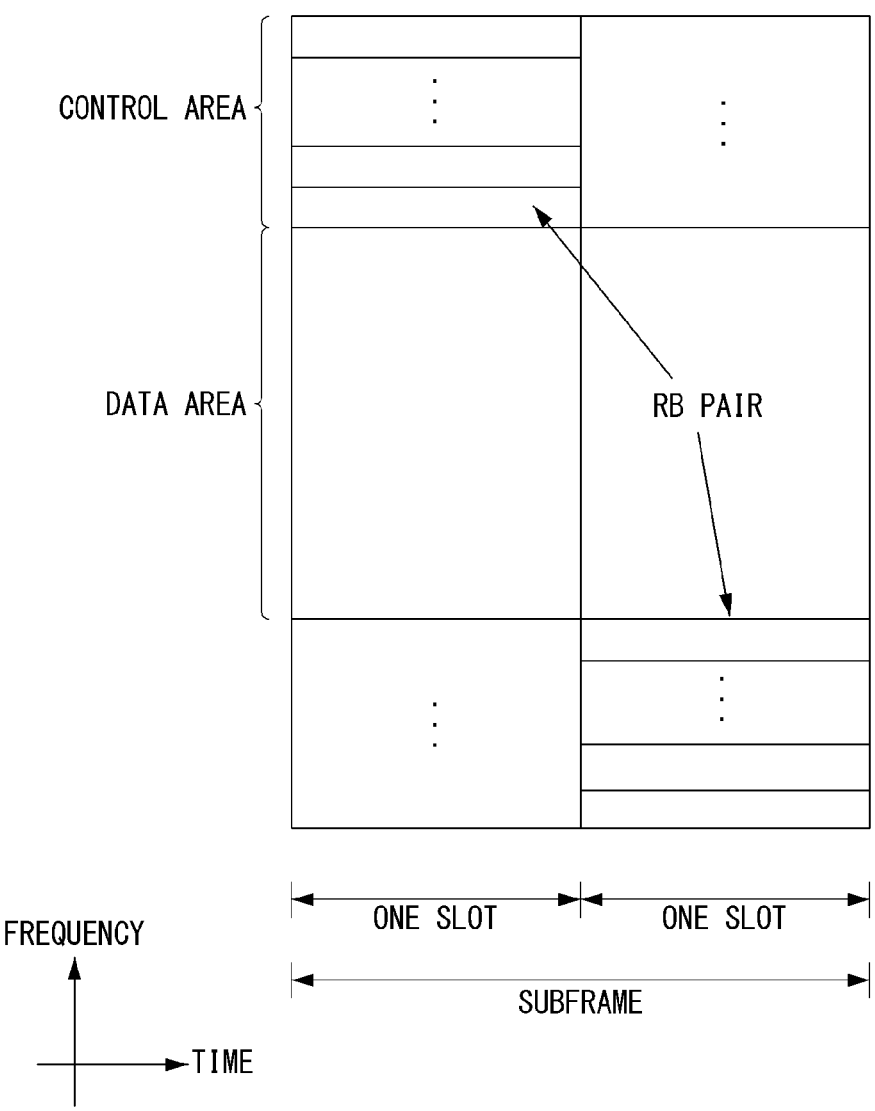

[FIG. 5]
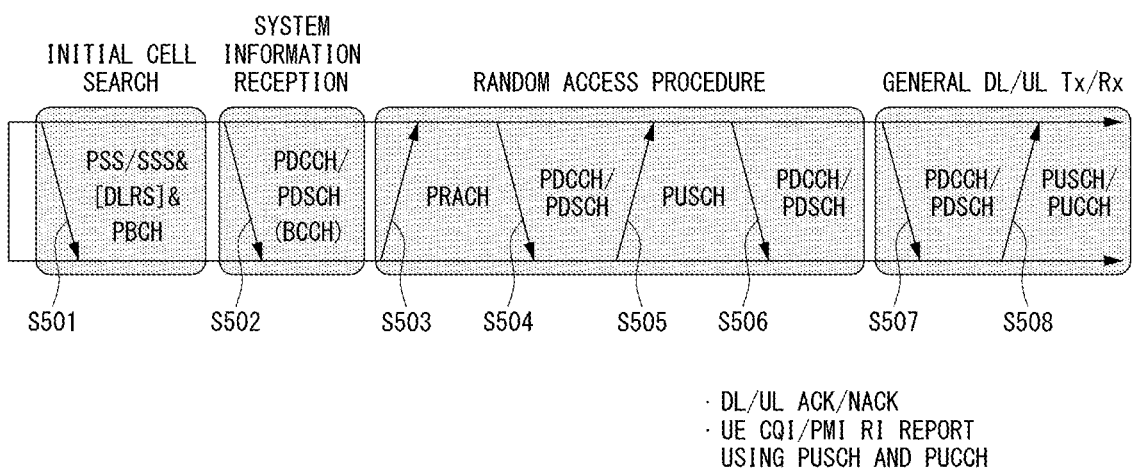
- DL/UL ACK/NACK
- UE CQI/PMI RI REPORT USING PUSCH AND PUCCH

[FIG. 6]
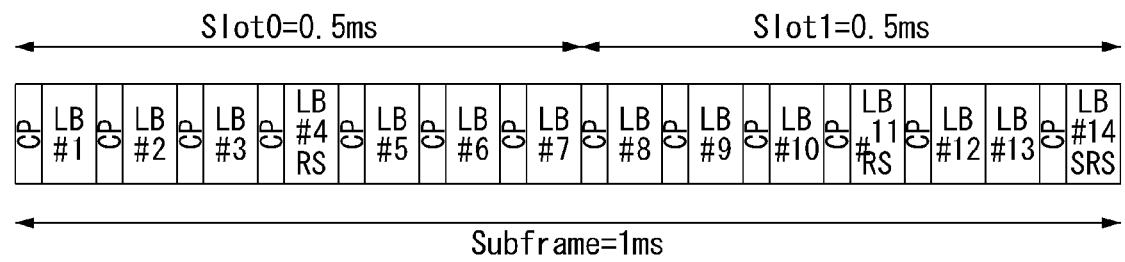

[FIG. 7A]
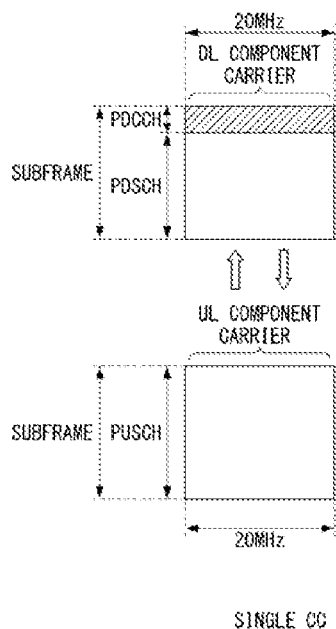
SINGLE CC
[FIG. 7B]
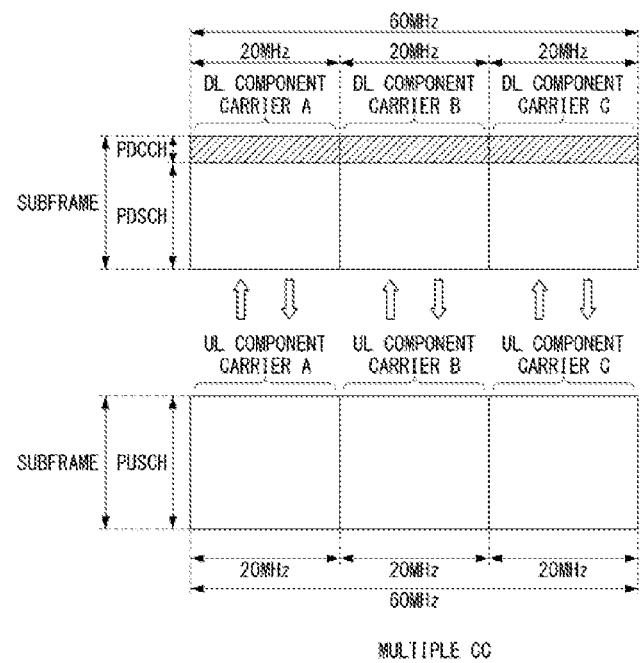
MULTIPLE CC

[FIG. 8]
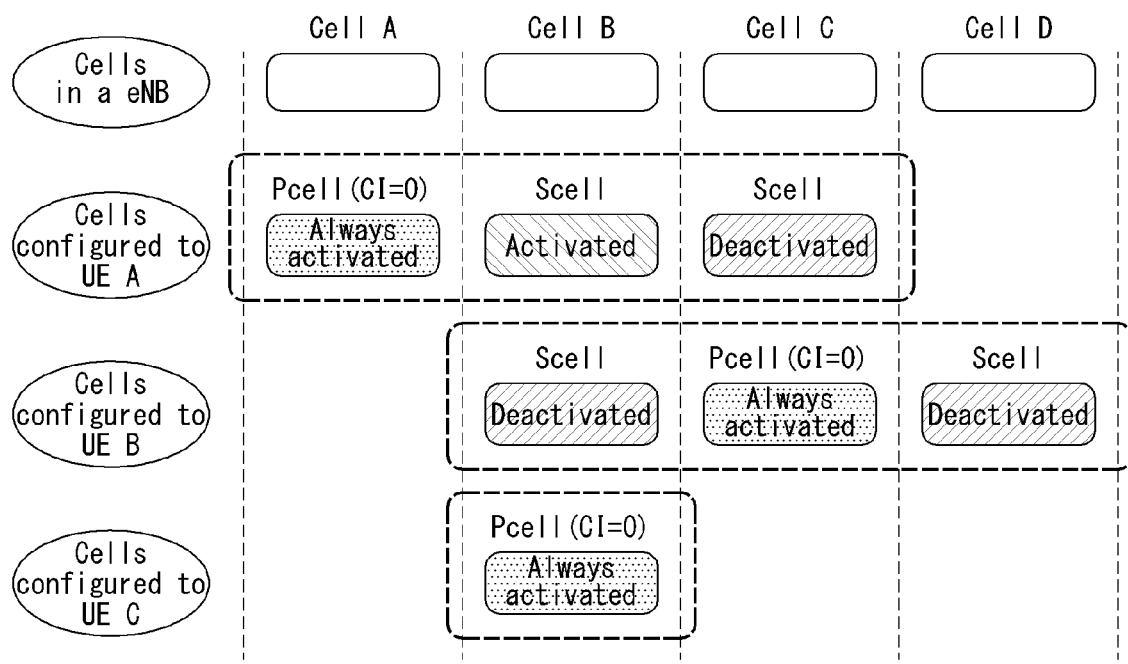

[FIG. 9]
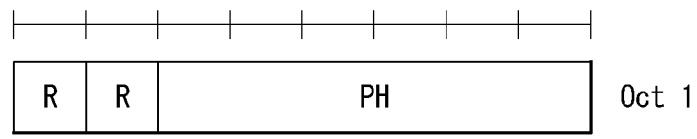

[FIG. 10A]

| C7 | C6 | C5 | C4 | C3 | C2 | C1 | R |
|----|----|----|----|----|----|----|---|
| P | V | \multicolumn{6}{l} PH(Type2, PCell) | | | | | |
| R | R | $P_{CMAX,c}$ 1 | | | | | |
| P | V | PH(Type1, PCell) | | | | | |
| R | R | $P_{CMAX,c}$ 2 | | | | | |
| P | V | PH(Type x, SCell 1) | | | | | |
| R | R | $P_{CMAX,c}$ 3 | | | | | |

...

| P | V | PH(Type x, SCell n) |
| R | R | $P_{CMAX,c}$ m |

[FIG. 10B]

| C7 | C6 | C5 | C4 | C3 | C2 | C1 | R |
|----|----|----|----|----|----|----|---|
| P | V | PH(Type 2, PCell) | | | | | |
| R | R | $P_{CMAX,c}$ 1 | | | | | |
| P | V | PH(Type 2, PUCCH SCell) | | | | | |
| R | R | $P_{CMAX,c}$ 2 | | | | | |
| P | V | PH(Type 1, PCell) | | | | | |
| R | R | $P_{CMAX,c}$ 3 | | | | | |
| P | V | PH(Type x, SCell 1) | | | | | |
| R | R | $P_{CMAX,c}$ 4 | | | | | |

...

| P | V | PH(Type x, SCell n) |
| R | R | $P_{CMAX,c}$ m |

[FIG. 10C]

| C7 | C6 | C5 | C4 | C3 | C2 | C1 | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH(Type2, PCell) | | | | | |
| R | R | $P_{CMAX,c}$ 1 | | | | | |
| P | V | PH(Type1, PCell) | | | | | |
| R | R | $P_{CMAX,c}$ 2 | | | | | |
| P | V | PH(Type x, SCell 1) | | | | | |
| R | R | $P_{CMAX,c}$ 3 | | | | | |

. . .

| P | V | PH(Type x, SCell n) | | | | | |
|---|---|---|---|---|---|---|---|
| R | R | $P_{CMAX,c}$ m | | | | | |

[FIG. 10D]

| C7 | C6 | C5 | C4 | C3 | C2 | C1 | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH(Type 2, PCell) | | | | | |
| R | R | $P_{CMAX,c}$ 1 | | | | | |
| P | V | PH(Type 2, PUCCH SCell) | | | | | |
| R | R | $P_{CMAX,c}$ 2 | | | | | |
| P | V | PH(Type 1, PCell) | | | | | |
| R | R | $P_{CMAX,c}$ 3 | | | | | |
| P | V | PH(Type x, SCell 1) | | | | | |
| R | R | $P_{CMAX,c}$ 4 | | | | | |

. . .

| P | V | PH(Type x, SCell n) | | | | | |
|---|---|---|---|---|---|---|---|
| R | R | $P_{CMAX,c}$ m | | | | | |

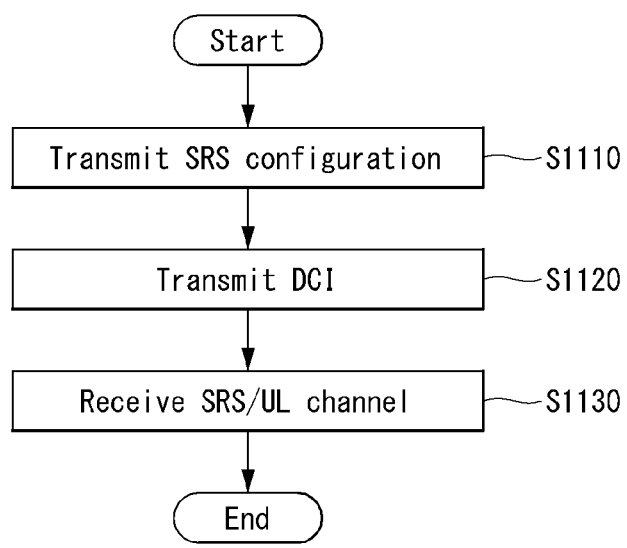
[FIG. 11]

[FIG. 12]
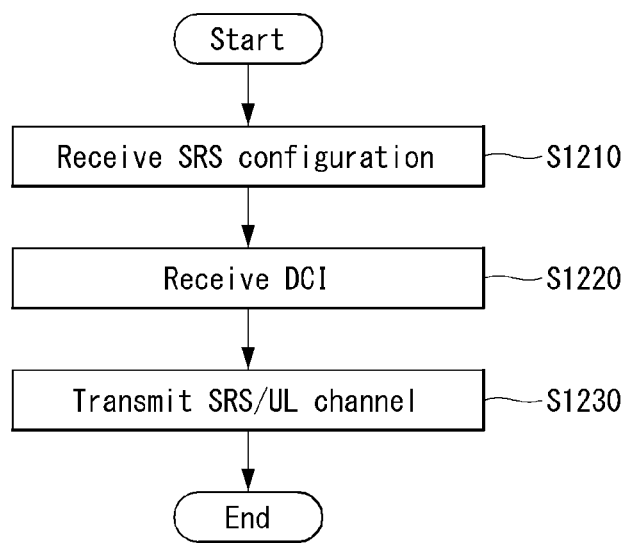

[FIG. 13]
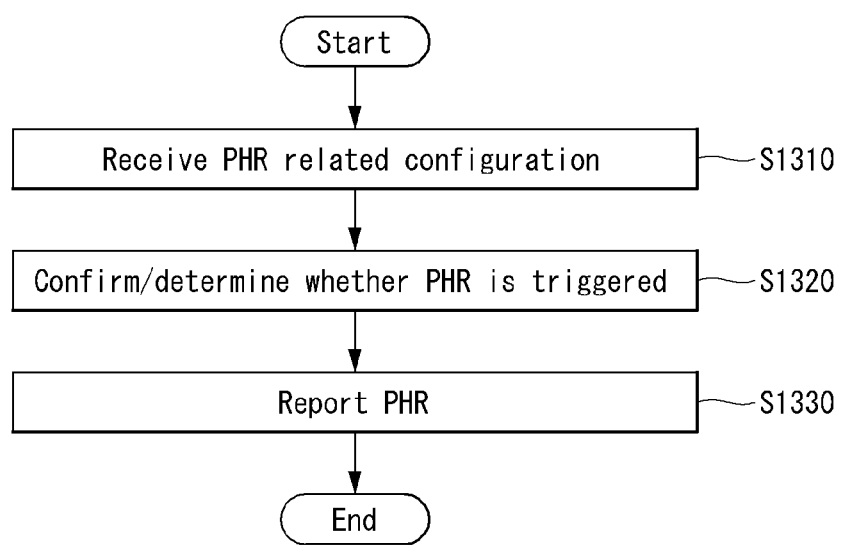

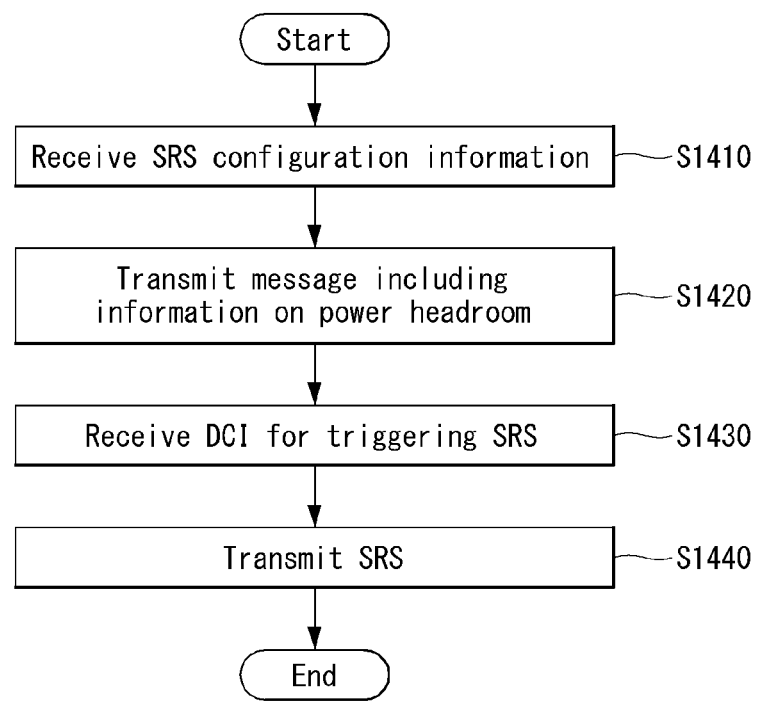
[FIG. 14]

[FIG. 15]
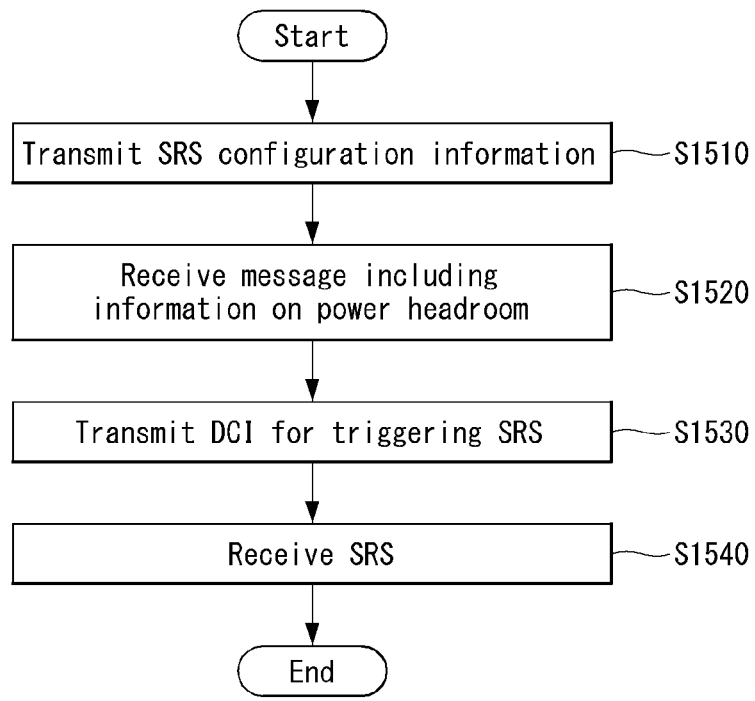

[FIG. 16]
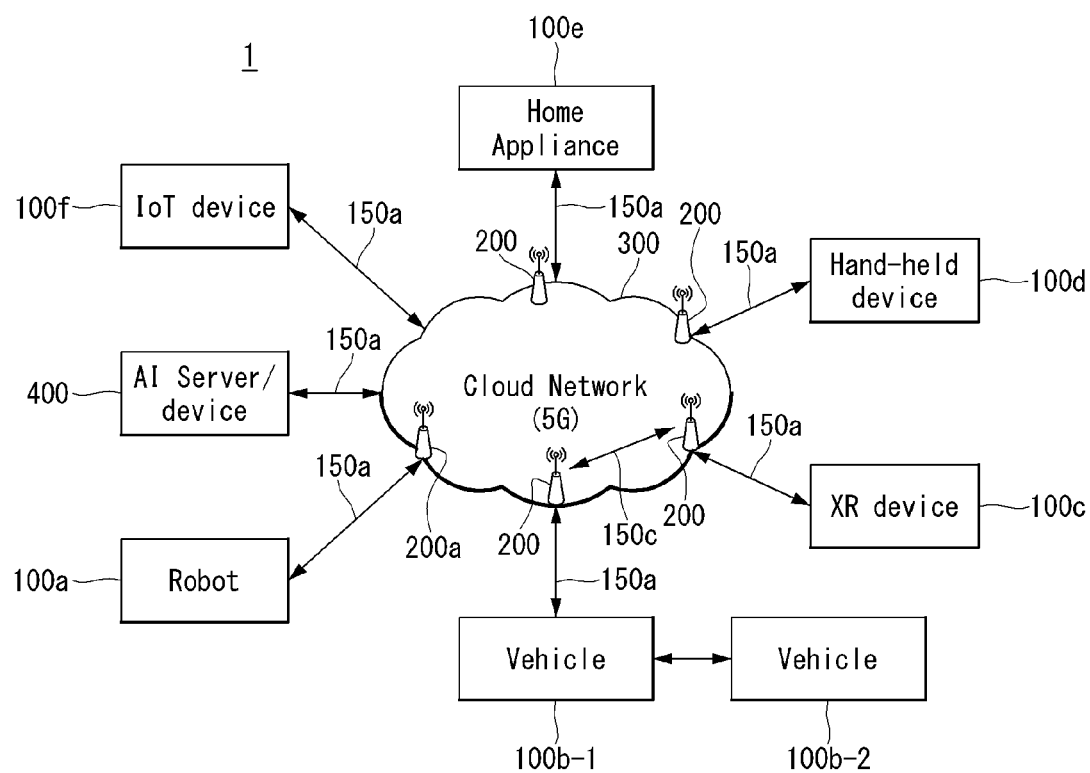

[FIG. 17]
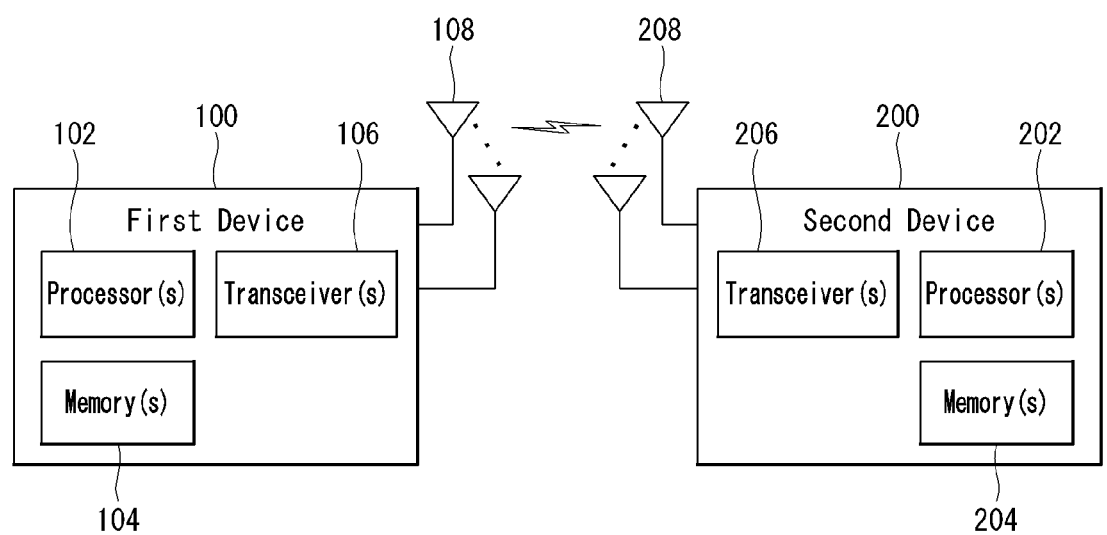

[FIG. 18]
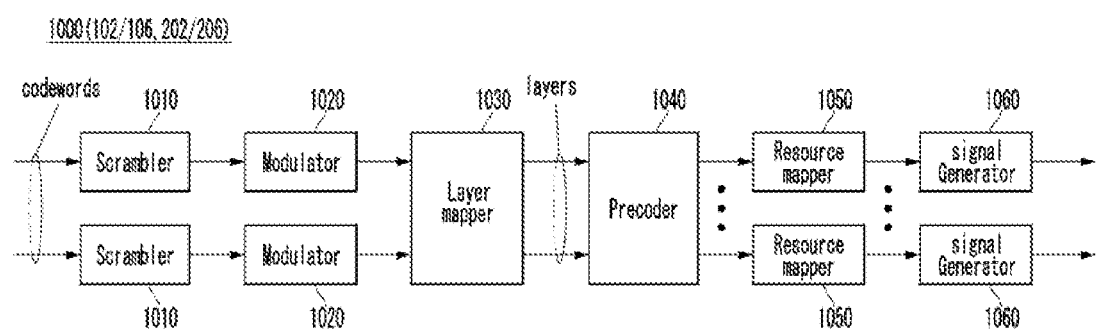

[FIG. 19]
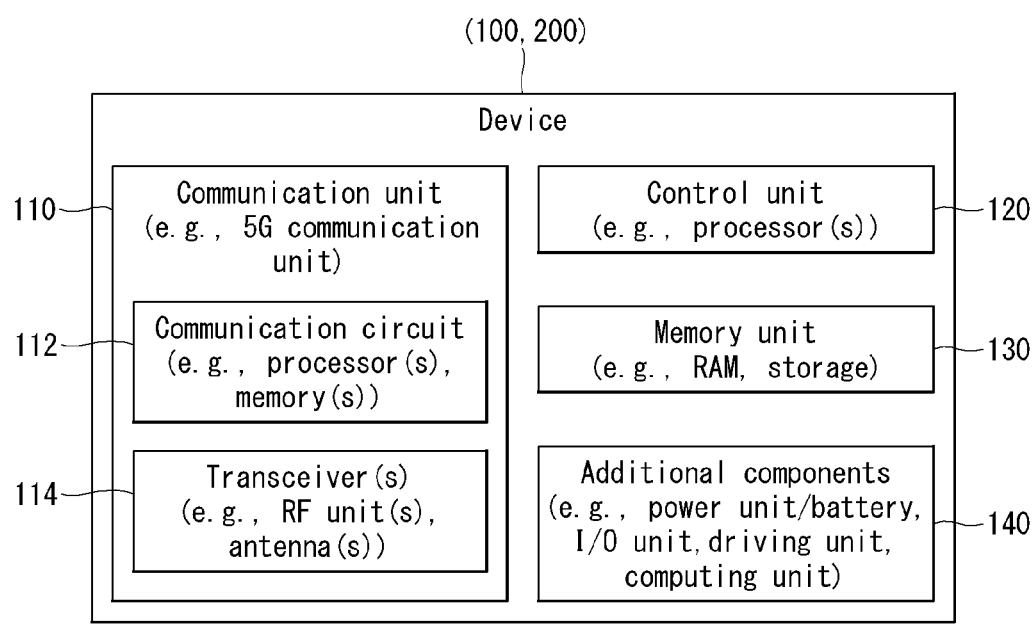

[FIG. 20]
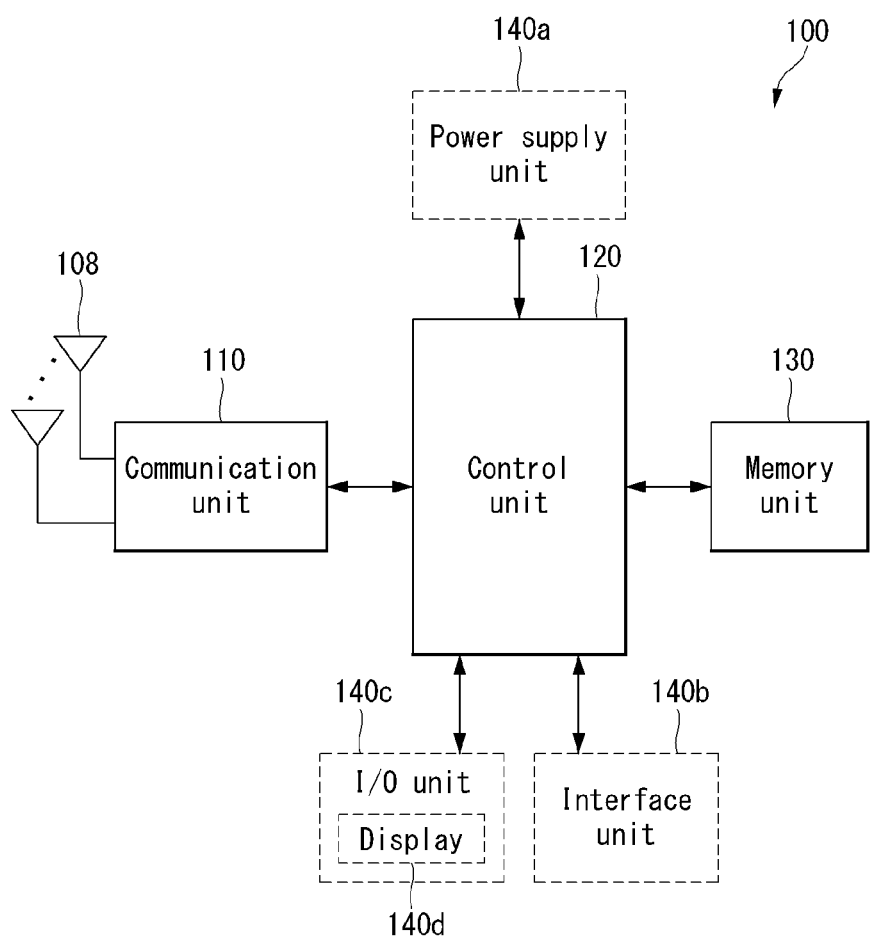

METHOD AND DEVICE FOR TRANSMITTING AND RECEIVING SOUNDING REFERENCE SIGNAL IN WIRELESS COMMUNICATION SYSTEM

CROSS-REFERENCE TO RELATED APPLICATIONS

Pursuant to 35 U.S.C. § 119(e) this application is a continuation of International Application No. PCT/KR2020/013518, filed on Oct. 5, 2020, which claims the benefit of U.S. Provisional Application No. 62/909,739, filed on Oct. 2, 2019, the contents of which are all hereby incorporated by reference herein in their entirety.

TECHNICAL FIELD

The present disclosure relates to a method and a device for transmitting and receiving a sounding reference signal in a wireless communication system.

BACKGROUND ART

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

SUMMARY

The present disclosure proposes a method for transmitting a sounding reference signal (SRS) of a sounding reference signal (SRS).

A legacy SRS transmitted in a last symbol of a subframe and an additional SRS transmitted in one or more symbols other than the last symbol are different in terms of objects thereof. The object of the legacy SRS is primarily uplink channel information acquisition and UL link adaptation, while the object of the additional SRS is to enhance capacity and coverage for downlink channel acquisition. When a difference between the objects is considered, independent power control needs to be supported for transmission of the additional SRS.

The present disclosure proposes a method for solving the above-described problem.

Objects of the disclosure are not limited to the foregoing, and other unmentioned objects would be apparent to one of ordinary skill in the art from the following description.

A method for transmitting, by a user equipment (UE), a sounding reference signal (SRS) in a wireless communication system according to an embodiment of the present disclosure includes: receiving configuration information of the sounding reference signal (SRS); transmitting a message including information on a power headroom (PH) related to transmission power of the SRS; receiving downlink control information (DCI) for triggering the transmission of the SRS; and transmitting the SRS.

The SRS is configured in a region consisting of at least one symbol other than a last symbol of a subframe, and the SRS is transmitted with transmission power based on a transmission power control (TPC) command related to control of transmission power.

The PH is related to a power headroom report (PHR) of a specific type, and the specific type is based on a type of a power headroom report for a serving cell in which a physical uplink shared channel (PUSCH) and a physical uplink control channel (PUCCH) are not configured.

The message may be based on a power headroom report (PHR) MAC CE.

The PH may be a Type 3 PH.

When the message is transmitted based on a pre-configured timer or trigger condition, a target for acquiring the PH may be determined based on configuration information for reporting the Type 3 PH.

The target for acquiring the PH may be i) the SRS or ii) an SRS in a secondary cell (SCell) in which a physical uplink shared channel (PUSCH) and a physical uplink control channel (PUCCH) are not configured.

The configuration information for reporting the Type 3 PH may be configured through a higher layer.

The TPC command may be acquired based on blind detection related to downlink control information (DCI), and the blind detection may be performed based on a plurality of RNTIs related to TPC.

The plurality of RNTIs related to the TPC may include first RNTI and second RNTI, and the TPC command may be acquired through the blind detection based on the second RNTI.

The first RNTI may be based on srs-TPC-RNTI, and the TPC command for the SRS in the secondary cell (SCell) in which the physical uplink shared channel (PUSCH) and the physical uplink control channel (PUCCH) are not configured may be acquired through the blind detection based on the srs-TPC-RNTI.

A user equipment (UE) for transmitting a sounding reference signal (SRS) in a wireless communication system according to another embodiment of the present disclosure includes: one or more transceivers;
one or more processors controlling the one or more transceivers; and one or more memories operatively connectable to the one or more processors, and storing instructions of performing operations when the transmission of the sounding reference signal is executed by the one or more processors.

The operations include receiving configuration information of the sounding reference signal (SRS), transmitting a message including information on a power headroom (PH) related to transmission power of the SRS, receiving downlink control information (DCI) for triggering the transmission of the SRS, and transmitting the SRS.

The SRS is configured in a region consisting of at least one symbol other than a last symbol of a subframe, and the SRS is transmitted with transmission power based on a transmission power control (TPC) command related to control of transmission power.

The PH is related to a power headroom report (PHR) of a specific type, and the specific type is based on a type of a power headroom report for a serving cell in which a physical uplink shared channel (PUSCH) and a physical uplink control channel (PUCCH) are not configured.

The message is based on a power headroom report (PHR) MAC CE.

A device according to yet another embodiment of the present disclosure includes one or more memories and one or more processors functionally connected to the one or more memories.

The one or more processors are configured to control the device to receive configuration information of the sounding reference signal (SRS), transmit a message including information on a power headroom (PH) related to transmission power of the SRS, receive downlink control information (DCI) for triggering the transmission of the SRS, and transmit the SRS.

The SRS is configured in a region consisting of at least one symbol other than a last symbol of a subframe, and the SRS is transmitted with transmission power based on a transmission power control (TPC) command related to control of transmission power.

The PH is related to a power headroom report (PHR) of a specific type, and the specific type is based on a type of a power headroom report for a serving cell in which a physical uplink shared channel (PUSCH) and a physical uplink control channel (PUCCH) are not configured.

One or more non-transitory computer-readable media according to still yet another embodiment of the present disclosure store one or more instructions.

One or more instructions executable by one or more processors is configured to control a UE to: receive configuration information of the sounding reference signal (SRS); transmit a message including information on a power headroom (PH) related to transmission power of the SRS; receive downlink control information (DCI) for triggering the transmission of the SRS; and transmit the SRS.

The SRS is configured in a region consisting of at least one symbol other than a last symbol of a subframe, and the SRS is transmitted with transmission power based on a transmission power control (TPC) command related to control of transmission power.

The PH is related to a power headroom report (PHR) of a specific type, and the specific type is based on a type of a power headroom report for a serving cell in which a physical uplink shared channel (PUSCH) and a physical uplink control channel (PUCCH) are not configured.

A method for receiving, by a base station (BS), a sounding reference signal (SRS) in a wireless communication system according to still yet another embodiment of the present disclosure includes: transmitting configuration information of the sounding reference signal (SRS); receiving a message including information on a power headroom (PH) related to transmission power of the SRS; transmitting downlink control information (DCI) for triggering the transmission of the SRS; and receiving the SRS.

The SRS is configured in a region consisting of at least one symbol other than a last symbol of a subframe, and the SRS is transmitted with transmission power based on a transmission power control (TPC) command related to control of transmission power.

The PH is related to a power headroom report (PHR) of a specific type, and the specific type is based on a type of a power headroom report for a serving cell in which a physical uplink shared channel (PUSCH) and a physical uplink control channel (PUCCH) are not configured.

A BS for receiving a sounding reference signal (SRS) in a wireless communication system according to still yet another embodiment of the present disclosure includes: one or more transceivers; one or more processors controlling the one or more transceivers; and one or more memories operatively connectable to the one or more processors, and storing instructions of performing operations when the reception of the sounding reference signal is executed by the one or more processors.

The operations include transmitting configuration information of the sounding reference signal (SRS), receiving a message including information on a power headroom (PH) related to transmission power of the SRS, transmitting downlink control information (DCI) for triggering the transmission of the SRS, and receiving the SRS.

The SRS is configured in a region consisting of at least one symbol other than a last symbol of a subframe, and the SRS is transmitted with transmission power based on a transmission power control (TPC) command related to control of transmission power.

The PH is related to a power headroom report (PHR) of a specific type, and the specific type is based on a type of a power headroom report for a serving cell in which a physical uplink shared channel (PUSCH) and a physical uplink control channel (PUCCH) are not configured.

Advantageous Effect

According to an embodiment of the present disclosure, a message including information on a power headroom (PH) related to transmission power of the SRS is transmitted. The PH is related to a specific type of power headroom report, and the specific type is based on a type of a power headroom report for a serving cell in which a physical uplink shared channel (PUSCH) and a physical uplink control channel (PUCCH) are not configured.

A power headroom report of an additional SRS can be performed based on a legacy Type 3 scheme. Accordingly, independent power control from a legacy SRS can be performed for the additional SRS without exerting another influence on a legacy power headroom report operation.

Effects of the disclosure are not limited to the foregoing, and other unmentioned effects would be apparent to one of ordinary skill in the art from the following description.

DESCRIPTION OF DRAWINGS

FIGS. 1A and 1B show the structure of a radio frame in a wireless communication system to which a method proposed in the disclosure may be applied.

FIG. 2 is a diagram illustrating a resource grid for one downlink slot in a wireless communication system to which a method proposed in the disclosure may be applied.

FIG. 3 shows the structure of a downlink subframe in a wireless communication system to which a method proposed in the disclosure may be applied.

FIG. 4 shows the structure of an uplink subframe in a wireless communication system to which a method proposed in the disclosure may be applied.

FIG. 5 illustrates physical channels and general signal transmission used in a 3GPP system.

FIG. 6 illustrates an uplink subframe including an SRS in a wireless communication system to which a method proposed in the disclosure may be applied.

FIGS. 7A and 7B illustrate one example of a component carrier and carrier aggregation in a wireless communication system to which a method proposed in the disclosure may be applied.

FIG. 8 illustrates an example the distinguishment of cells in a system supporting carrier aggregation, to which a method proposed in the disclosure may be applied.

FIG. 9 illustrates a PHR MAC control element to which a method proposed in the present disclosure may be applied.

FIGS. 10A and 10B illustrate an example of an extended PHR MAC CE to which a method proposed by the present disclosure may be applied.

FIGS. 10C and 10D illustrate another example of the extended PHR MAC CE to which a method proposed by the present disclosure may be applied.

FIG. 11 illustrates a method for receiving, by a BS, an SRS according to an embodiment of the present disclosure.

FIG. 12 illustrates a method for receiving, by a UE, an SRS according to an embodiment of the present disclosure.

FIG. 13 illustrates a method for reporting, by a UE, a power headroom according to an embodiment of the present disclosure.

FIG. 14 is a flowchart for describing a method of transmitting, by a UE, a sounding reference signal in a wireless communication system according to an embodiment of the present disclosure.

FIG. 15 is a flowchart for describing a method for receiving, by a BS, a sounding reference signal in a wireless communication system according to another embodiment of the present disclosure.

FIG. 16 illustrates a communication system 1 applied to the present disclosure.

FIG. 17 illustrates a wireless device which may be applied to the present disclosure.

FIG. 18 illustrates a signal processing circuit applied to the present disclosure.

FIG. 19 illustrates another example of a wireless device applied to the present disclosure.

FIG. 20 illustrates a portable device applied to the present disclosure.

MODE FOR DISCLOSURE

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the disclosure should be construed to extend to any alterations, equivalents and substitutes in addition to those which are particularly set out in the accompanying drawings.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

General System

FIGS. 1A and 1B show the structure of a radio frame in a wireless communication system to which a method proposed in the disclosure may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1A exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1B shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and an Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

TABLE 1

| 1. Uplink-Downlink configuration | 2. Downlink-to-Uplink Switch-point periodicity | 3. Subframe number | | | | | | | | | |
|---|---|---|---|---|---|---|---|---|---|---|---|
| | | 4. 0 | 5. 1 | 6. 2 | 7. 3 | 8. 4 | 9. 5 | 10. 6 | 11. 7 | 12. 8 | 13. 9 |
| 14. 0 | 15. 5 ms | 16. D | 17. S | 18. U | 19. U | 20. U | 21. D | 22. S | 23. U | 24. U | 25. U |
| 26. 1 | 27. 5 ms | 28. D | 29. S | 30. U | 31. U | 32. D | 33. D | 34. S | 35. U | 36. U | 37. D |
| 38. 2 | 39. 5 ms | 40. D | 41. S | 42. U | 43. D | 44. D | 45. D | 46. S | 47. U | 48. D | 49. D |
| 50. 3 | 51. 10 ms | 52. D | 53. S | 54. U | 55. D | 56. D | 57. D | 58. D | 59. D | 60. D | 61. D |
| 62. 4 | 63. 10 ms | 64. D | 65. S | 66. U | 67. U | 68. D | 69. D | 70. D | 71. D | 72. D | 73. D |
| 74. 5 | 75. 10 ms | 76. D | 77. S | 78. U | 79. D | 80. D | 81. D | 82. D | 83. D | 84. D | 85. D |
| 86. 6 | 87. 5 ms | 88. D | 89. S | 90. U | 91. U | 92. U | 93. D | 94. S | 95. U | 96. U | 97. D |

Table 2 represents configuration (length of DwPTS/GP/UpPTS) of a special subframe.

TABLE 2

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIGS. 1A and 1B is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which a method proposed in the disclosure may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the disclosure is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

FIG. 3 shows the structure of a downlink subframe in a wireless communication system to which a method proposed in the disclosure may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which a method proposed in the disclosure may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Physical Channel and General Signal Transmission

FIG. 5 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S501). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S502).

Meanwhile, when there is no radio resource first accessing the eNB or for signal transmission, the UE may perform a Random Access Procedure (RACH) to the eNB (S503 to S506). To this end, the UE may transmit a specific sequence to a preamble through a Physical Random Access Channel (PRACH) (S503 and S505) and receive a response message (Random Access Response (RAR) message) for the preamble through the PDCCH and a corresponding PDSCH. In the case of a contention based RACH, a Contention Resolution Procedure may be additionally performed (S506).

The UE that performs the above procedure may then perform PDCCH/PDSCH reception (S507) and Physical Uplink Shared Channel (PUSCH)/Physical Uplink Control Channel (PUCCH) transmission (S508) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Sounding Reference Signal (SRS)

An SRS is mainly used for channel quality measurement to perform uplink frequency-selective scheduling and is not related to transmission of uplink data and/or control information. However, the disclosure is not limited thereto and the SRS may be used for various other purposes to enhance power control or to support various start-up functions of recently unscheduled terminals. As an example of the start-up function, an initial modulation and coding scheme (MCS), initial power control for data transmission, timing advance, and frequency semi-selective scheduling may be included. In this case, frequency semi-selective scheduling refers to scheduling that selectively allocates frequency resources to a first slot of a subframe and allocating the frequency resources by pseudo-randomly jumping to another frequency in a second slot.

Further, the SRS may be used for measuring a downlink channel quality under the assumption that radio channels are reciprocal between the uplink and the downlink. The assumption is particularly effective in a time division duplex (TDD) system in which the uplink and the downlink share the same frequency spectrum and are separated in a time domain.

The SRS subframes transmitted by a certain UE in a cell may be represented by a cell-specific broadcast signal. A 4 bit cell-specific 'srsSubframeConfiguration' parameter represents 15 available subframe arrays through which the SRS may be transmitted over each radio frame. The arrays provide flexibility for adjustment of SRS overhead according to a deployment scenario.

A 16-th array completely turns off a switch of the SRS in the cell and this is primarily suitable for a serving cell that serves high-speed terminals.

FIG. 6 illustrates an uplink subframe including an SRS in a wireless communication system to which a method proposed in the disclosure may be applied.

Referring to FIG. 6, the SRS is continuously transmitted on the last SC-FDMA symbol on the arranged subframe. Therefore, the SRS and the DMRS are located in different SC-FDMA symbols.

PUSCH data transmission is not allowed in a specific SC-FDMA symbol for SRS transmission and as a result, when the sounding overhead is the highest, that is, even if SRS symbols are included in all subframes, the sounding overhead does not exceed approximately 7%.

Each SRS symbol is generated by a basic sequence (random sequence or a sequence set based on Zadoff-Ch (ZC)) for a given time unit and frequency band, and all terminals in the same cell use the same basic sequence. In this case, the SRS transmissions from a plurality of UEs in the same cell at the same time in the same frequency band are orthogonal by different cyclic shifts of the basic sequence, and are distinguished from each other.

By assigning different basic sequences to respective cells, the SRS sequences from different cells may be distinguished, but orthogonality between different basic sequences is not guaranteed.

SRS Transmission in NR System

In NR systems, an SRS sequence for SRS resources may be generated by Equation 1 below.

$$r^{(pi)}(n,l') = r_{u,v}^{(\alpha,\delta)}(n)$$

$$0 \leq n \leq 271 \cdot N_{sc}^{RB}/K_{TC}$$

$$l' \in \{0, 1, \ldots, N_{symb}^{SRS}-1\} \quad \text{[Equation 1]}$$

In Equation 1, $r_{u,v}^{(\alpha,\delta)}(n)$ denotes the sequence number (v) of SRS and the sequence set by the sequence group (u), and the transmission comb (TC) number, K_TC ($K_{TC}$), may be included in the higher layer parameter, SRS-TransmissionComb.

Further, for antenna port $p_i$, the cyclic shift (SC) $\alpha_i$ may be given as in Equation 2 below.

$$\alpha_i = 2\pi \frac{n_{SRS}^{cs,i}}{n_{SRS}^{cs,max}}$$

$$n_{SRS}^{cs,i} = \left(n_{SRS}^{cs} + \frac{n_{SRS}^{cs,max} p_i}{N_{ap}}\right) \bmod n_{SRS}^{cs,max}$$

[Equation 2]

In Equation 2, $n_{SRS}^{cs} \in \{0, 1, \ldots n_{SRS}^{cs,max}\}$ may be given by the higher layer parameter SRS-CyclicShiftConFIG. Further, the maximum value of the cyclic shift, if K_TC is 4, may be 12 (i.e., $n_{SRS}^{cs,max}=12$) and, if K_TC is 2, 8 (i.e., $n_{SRS}^{cs,max}=8$).

The sequence group $(u)(u=(f_{gh}(n_{s,f}\mu l')+n_{ID}^{SRS}$ mod 30)mod 30) and the sequence number (u) may comply with the higher layer parameter SRS-GroupSequenceHopping. Further, the SRS sequence identifier $n_{ID}^{SRS}$ may be given by the higher layer parameter SRS-SequenceId. l' (i.e., l'∈{0, 1, ..., $N_{symb}^{SRS}$-1}) denotes the OFDM symbol number in the SRS resource.

At this time, if SRS-GroupSequenceHopping is 0, group hopping and sequence hopping are not used, which may be represented as in Equation 3 below.

$$f_{gh}(n_{s,f}\mu,l')=0$$

$$v=0$$

[Equation 3]

In Equation 3, f_gh(x, y) denotes sequence group hopping, and v denotes sequence hopping.

Or, if SRS-GroupSequenceHopping is 1, group hopping, not sequence hopping, is used, and this may be expressed as in Equation 4.

$$f_{gh}(n_{s,f}l')=(\Sigma_{m=0}^7 c(8(n_{s,f}\mu N_{symb}^{SRS}+l')+m) \cdot 2^m) \bmod 30$$

$$v=0$$

[Equation 4]

In Equation 4, f_gh(x, y) denotes sequence group hopping, and v denotes sequence hopping. c(i) denotes the pseudo-random sequence and may be initialized as $c_{init} = \lfloor n_{ID}^{SRS}/30 \rfloor$ at the start of each radio frame.

Or, if SRS-GroupSequenceHopping is 2, sequence hopping, not group hopping, is used, and this may be expressed as in Equation 5.

$$f_{gh}(n_{s,f}, l') = 0$$

$$v = \begin{cases} c(n_{s,f} N_{symb}^{SRS} + l') & M_{sc,b}^{SRS} \geq 3N_{sc}^{RB} \\ 0 & \text{otherwise} \end{cases}$$

[Equation 5]

In Equation 5, f_gh(x, y) denotes sequence group hopping, and v denotes sequence hopping. c(i) denotes the pseudo-random sequence and may be initialized as $c_{init} = \lfloor n_{ID}^{SRS}/30 \rfloor \cdot 2^5 + (n_{ID}^{SRS} + \Delta_{ss}) \bmod 30$ at the start of each radio frame (where, $\Delta_{ss} \in \{0, 1, \ldots, 29\}$).

Sounding Reference Signal (SRS) Hopping

SRS hopping may be performed only upon periodic SRS triggering (e.g., triggering type 0). Further, allocation of SRS resources may be provided according to a pre-defined hopping pattern. In this case, the hopping pattern may be designated UE-specifically via higher layer signaling (e.g., RRC signaling) and no overlap is allowed.

Further, SRS is frequency-hopped using the hopping pattern in every subframe where cell-specific and/or UE-specific SRS is transmitted, and the start position and hopping equation in the frequency domain of SRS hopping may be interpreted via Equation 6 below.

$$k_0^{(p)} = \bar{k}_0^{(p)} + \sum_{b=0}^{B_{SRS}} K_{TC} M_{sc,b}^{RS} n_b$$

[Equation 6]

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

$$F_b(n_{SRS}) = \begin{cases} (N_b/2)\left\lfloor \frac{n_{SRS} \bmod \prod_{b'=b_{hop}}^b N_{b'}}{\prod_{b'=b_{hop}}^b N_{b'}} \right\rfloor + \\ \qquad \left\lfloor \frac{n_{SRS} \bmod \prod_{b'=b_{hop}}^b N_{b'}}{2\prod_{b'=b_{hop}}^{b-1} N_{b'}} \right\rfloor & \text{if } N_b \text{ even} \\ \lfloor N_b/2 \rfloor \lfloor n_{SRS}/\prod_{b'=b_{hop}}^{b-1} N_{b'} \rfloor & \text{if } N_b \text{ odd} \end{cases}$$

$$n_{SRS} = \begin{cases} 2N_{SP} n_f + 2(N_{SP}-1)\lfloor \frac{n_s}{10} \rfloor + \lfloor \frac{T_{offset}}{T_{offset\_max}} \rfloor, & \text{for 2 ms SRS periodicity of frame structure type 2} \\ \lfloor (n_f \times 10 + \lfloor n_s/2 \rfloor)/T_{SRS} \rfloor, & \text{otherwise} \end{cases}$$

In Equation 6, nSRS means the hopping interval in the time domain, and Nb denotes the number of branches allocated to tree level b where b may be determined by the BSRS configuration in the dedicated RRC.

FIGS. 7A and 7B illustrate one example of a component carrier and carrier aggregation in a wireless communication system to which a method proposed in the disclosure may be applied.

FIG. 7A shows a single carrier structure defined in the LTE system. Two types of component carriers are used: DL CC and UL CC. A component carrier may have frequency bandwidth of 20 MHz.

FIG. 7B shows a carrier aggregation structure used in the LTE A system. FIG. 7B shows a case where three component carriers having frequency bandwidth of 20 MHz are aggregated. In this example, 3 DL CCs and 3 UL CCs are employed, but the number of DL CCs and UL CCs is not limited to the example. In the case of carrier aggregation, the UE is capable of monitoring 3 CCs at the same time, capable of receiving a downlink signal/data and transmitting an uplink signal/data.

If a particular cell manages N DL CCs, the network may allocate M (M≤N) DL CCs to the UE. At this time, the UE may monitor only the M DL CCs and receive a DL signal from the M DL CCs. Also, the network may assign priorities for L (L≤M≤N) DL CCs so that primary DL CCs may be allocated to the UE; in this case, the UE has to monitor the L DL CCs. This scheme may be applied in the same manner to uplink transmission.

Linkage between a carrier frequency of downlink resources (or DL CC) and a carrier frequency of uplink resources (or UL CC) may be designated by a higher layer message such as an RRC message or system information. For example, according to the linkage defined by system information block type 2 (SIB2), a combination of DL resources and UL resources may be determined. More specifically, the linkage may refer to a mapping relationship between a DL CC through which a PDCCH carrying an UL grant is transmitted and an UL CC that uses the UL grant; or a mapping relationship between a DL CC (or an UL CC) through which data for HARQ signal are transmitted and an UL CC (or a DL CC) through which a HARQ ACK/NACK signal is transmitted.

FIG. 8 illustrates an example a distinguishment of cells in a system supporting carrier aggregation, to which a method proposed in the disclosure may be applied.

Referring to FIG. 8, a configured cell is a cell which is configured for carrier aggregation based on a measurement report among cells of an eNB and is configured for each UE as shown in FIG. 5. A configured cell may reserve a resource for ack/nack transmission in advance with respect to PDSCH transmission. An activated cell is a cell configured to actually transmit a PDSCH/PUSCH among the configured cells, which performs Channel State Information (CSI) reporting for PDSCH/PUSCH transmission and Sounding Reference Signal (SRS) transmission. A de-activated cell is a cell configured not to perform PDSCH/PUSCH transmission by a command from the eNB or timer operation, which may stop CSI reporting and SRS transmission.

The contents described above may be applied in combination with methods proposed in the present disclosure to be described below or may be supplemented to clarify technical features of the methods proposed in the present disclosure. Methods to be described below are just distinguished for convenience and it is needless to say that some components of any one method may be substituted with some components of another method or may be applied in combination with each other.

In the present disclosure, '/' means 'and', 'or', or 'and/or' according to a context.

In the case of closed-loop power control controlled by a transmit power control (TPC) command of the BS, information regarding which degree of headroom (e.g., a value acquired by subtracting UL channel power which is currently transmitted from maximum power, i.e., which degree of reserve power remains) for UL channel power may be required.

However, in a current standard point of view, power control for the legacy SRS depends on a PUSCH power control mechanism and the same is also applied to a power headroom report (PHR). Therefore, in the additional SRS having a power control configuration separated from the legacy SRS, only when a separate PHR method or process should be present, an efficient BS-UE power control operation may be performed.

In the present disclosure, by considering such a problem, a method of a power control configuration for the additional SRS between the BS and the UE and a power headroom report for the additional SRS of the UE is proposed, and a UE operation based on the corresponding configuration is described.

When an LTE standard up to Rel-15 is described, a sounding reference signal (SRS) in conventional LTE may be transmitted in a last symbol of each subframe in an FDD system. In a TDD system, in addition to SRS transmission in a UL normal subframe, a 1 symbol or 2 symbol SRS may be additionally transmitted according to a special subframe configuration by utilizing UpPTS in a special subframe, and a 2 symbol or 4 symbol SRS may be transmitted according to an SC-FDMA symbol for an additional UL usage being configured in addition to conventional UpPTS in the special subframe. An LTE SRS is divided into type 0 and type 1 triggering according to a time domain feature, and is a periodic SRS based on a higher layer configuration in the case of type 0 and an aperiodic SRS triggered by DCI in the case of type 1.

Transmission timing of Type 1 SRS: When the UE detects a positive SRS request in subframe n (or slot 2n or slot 2n+1), the UE transmits the SRS in an initial subframe which conforms with UE-specific SRS configurations (i.e., an SRS transmission period, an SRS transmission offset, etc.) after n+k (i.e., k=4 or determined according to a UE capability).

<Power Control Mechanism of Legacy SRS in LTE>

The power control mechanism in the 3GPP standard may be divided into open-loop power control and closed-loop power control. The open loop power control is a type in which open-loop power control parameters such as and are configured through a higher layer signaling between the BS and the UE upon specific UL channel transmission, and as a result, the BS configures power upon the corresponding UL channel transmission. The closed-loop power control as a type in which a height of specific UL channel transmission power is adjusted through a dynamic indication of the BS in addition to the open-loop power control (i.e., closed-loop power control parameter $f_c$), may be indicated through a transmit power control (TPC) command field of DL/UL DCI. The closed-loop power control may be adjusted based on a strength of a UL channel signal received by the BS, but generally adjusted within the corresponding range based on the power headroom report (PHR) of the UE.

In the LTE standard, the power control is divided into PUSCH power control, PUCCH power control, and SRS power control, and the PUSCH power control is followed in the case of power control of a legacy SRS symbol (i.e., last symbol of subframe) in a normal UL subframe and a UpPTS SRS symbol in a special subframe. The reason is that since the object of the legacy SRS is the UL channel acquisition and the UL link adaptation, if the UE transmits the power of the SRS by assuming the power of the SRS as power when sending the PUSCH, the BS may directly utilize the power of the SRS upon PUSCH scheduling. Further, here, third SRS power control as not the power control for the legacy SRS in the normal UL subframe or the UpPTS SRS in the special subframe but power control for an carrier switching SRS transmitted in a DL dedicated serving cell in which the PUSCH and the PUCCH are not scheduled. The TPC command for the closed-loop power control for the PUSCH may be indicated through UL DCI and DCI formats 3 and 3A, and the TPC command for the PUCCH may be indicated through DL DCI and DCI formats 3 and 3A. A TPC command for the carrier switching SRS transmitted in the DL dedicated serving cell in which the PUSCH and the PUCCH are not scheduled is possible through DCI format 3B.

The PHR is also similarly divided into three types like the power control (i.e., Type 1, Type 2, and Type 3), and each type corresponds to a PHR for the PUSCH transmission power, a PHR for the PUCCH transmission power, and a PHR for the SRS transmission power. The Type 3 PHR for the SRS transmission power may also be regarded as a PHR for the carrier switching SRS transmitted in the DL dedicated serving cell in which the PUSCH and the PUCCH are not scheduled other than the power control for the legacy SRS or the UpPTS SRS.

Hereinafter, matters related to the UE operation for the SRS power control and Type 3 reporting for the power headroom will be described.

First, the UE operation for the SRS power control is described.

SRS Power Control UE Operation

A configuration for UE transmission power $p_{SRS}$ for the SRS transmitted in subframe i of the serving cell is defined as follows.

for serving cell c with frame structure type 2, and not configured for PUSCH/PUCCH transmission $$P_{SRS,c}(i) = \min\{P_{CMAX,c}(i), 10 \log_{10}(M_{SRS,c}) + P_{O\_SRS,c}(m) + \alpha_{SRS,c} \cdot PL_c f_{SRS,c}(i)\}[\text{dbm}],$$

otherwise, $$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\}[\text{dbm}].$$

Here, parameters related to the SRS transmission power are defined as follows.

$P_{CMAX,c}(i)$ is the configured UE transmit power defined in [6] in subframe i for serving cell c.

$P_{SRS\_OFFSET,c}(m)$ is semi-statically configured by higher layers for m=0 and m=1 for serving cell c. For SRS transmission given trigger type 0 then m=0 and for SRS transmission given trigger type 1 then m=1.

$M_{SRS,c}$ is the bandwidth of the SRS transmission in subframe i for serving cell c expressed in number of resource blocks.

$f_c(i)$ is the current PUSCH power control adjustment state for serving cell c.

$P_{O\_PUSCH,c}(j)$ and $\alpha_c(j)$ are parameters as defined in Subclause 5.1.1.1 for subframe i, where j=1.

$\alpha_{SRS,c}$ is the higher layer parameter alpha-SRS configured by higher layers for serving cell c.

$P_{O\_SRS,c}(m)$ is a parameter composed of the sum of a component $P_{O\_NOMINAL\_SRS,c}(m)$ which is p0-Nominal-PeriodicSRS or p0-Nominal-AperiodicSRS provided from higher layers for m=0 or 1 and a component $P_{O\_UE\_SRS,c}(m)$ which is p0-UE-PeriodicSRS or p0-UE-AperiodicSRS which is p0-UE-PeriodicSRS or p0-UE-AperiodicSRS provided by higher layers for m=0 or 1 for serving cell c. For SRS transmission given trigger type 0 then m=0 and for SRS transmission given trigger type 1 then m=1.

In the case of serving cell c in which a frame structure type is 2 and PUSCH/PUCCH transmission is not configured, a current SRS power control adjustment state is provided by $f_{SRS,c}(i)$ and defined as follows.

$f_{SRS,c}(i) = f_{SRS,c}(i-1) + \delta_{SRS,c}(i-K_{SRS})$ if accumulation is enabled, and $f_{SRS,c}(i) = \delta_{SRS,c}(i-K_{SRS})$ if accumulation is not enabled based on higher layer parameter Accumulation-enabled, where, $\delta_{SRS,c}(1-K_{SRS})$ is a correction value, also referred to as a SRS TPC command signalled on PDCCH with DCI format 3B in the most recent subframe i-$K_{SRS}$, where $K_{SRS} \geq 4$.

The UE is not expected to receive different SRS TPC command values for serving cell c in the same subframe.

The UE attempts to decode a PDCCH of DCI format 3B with CRC scrambled by higher layer parameter srs-TPC-RNTI-r14 in every subframe except where serving cell c is deactivated.

$\delta_{SRS,c}=0$ dB for a subframe where no TPC command in PDCCH with DCI format 3B is decoded for serving cell c or i is not an uplink/special subframe in TDD or FDD-TDD and serving cell c frame structure type 2.

If higher layer parameter fieldTypeFormat3B indicates 2-bit TPC command, the $\delta_{SRS}$ dB values signalled on PDCCH with DCI format 3B are given in Table 5.1.1.1-2 of TS 36.213 by replacing $\delta_{PUSCH,c}$ with $\delta_{SRS}$, or if higher layer parameter fieldTypeFormat3B indicates 1-bit TPC command, the $\delta_{SRS}$ dB values signalled on PDCCH with DCI format 3B are given in Table 5.1.1.1-3 of TS 36.213 by replacing $\delta_{PUSCH,c}$ with $\delta_{SRS}$.

If accumulation is enabled, $f_{SRS,c}(0)$ is the first value after reset of accumulation.

In the following case, the UE should reset accumulation.

For serving cell c, when $P_{O\_UE\_SRS}$ value is changed by higher layers

For serving cell c, when the UE receives random access response message for serving cell c For both types of $f_{SRS,c}(*)$ (accumulation or current absolute) the first value is set as follows.

If $P_{O\_UE\_SRS}$, value is received by higher layers, then $f_{SRS,c}(0)=0$ else, if the UE receives the random access response message for a serving cell c, then $$f_{SRS,c}(0) = \Delta P_{rampup,c} + \delta_{msg\ 2,c}, \text{ where}$$

$\delta_{msg\ 2,c}$ is the TPC command indicated in the random access response corresponding to the random access preamble transmitted in the serving cell c, see Subclause 6.2, and.

$$\Delta P_{rampup,c} = \min\left[\left\{\max\left(\begin{array}{c}0,\\ P_{CMAX,c} - (10\ \log_{10}(M_{SRS,c}(0)) + \\ P_{O\_SRS,c}(m) + \alpha_{SRS,c} \cdot PL_c)\end{array}\right)\right\}, \Delta P_{rampuprequested,c}\right]$$

$\Delta P_{rampuprequested,c}$ is provided by higher layers and corresponds to the total power ramp-up requested by higher layers from the first to the last preamble in the serving cell c, $M_{SRS,c}(0)$ is the bandwidth of the SRS transmission expressed in number of resource blocks valid for the subframe of first SRS transmission in the serving cell c.

When a secondary cell group (SCG) or PUCCH-SCell is not configured in the UE and total transmission power for a sounding reference symbol of an SC-FDMA symbol exceeds $\hat{P}_{CMAX}(i)$, the UE scales $\hat{P}_{SRS,c}(i)$ so as to satisfy the following condition for the SC-FDMA symbol of serving cell c and subframe i.

$$\sum_c w(i) \cdot \hat{P}_{SRS,c}(i) \leq \hat{P}_{CMAX}(i)$$

where, $\hat{P}_{SRS,c}(i)$ is the linear value of $P_{SRS,c}(i)$. $\hat{P}_{CMAX}(i)$ is the linear value of $P_{CMAX}$ defined in subframe i and w(i) is a scaling factor of $\hat{P}_{SRS,c}(i)$ for serving cell c, where 0<w(i)≤1. The w(i) values are the same across serving cells.

When the secondary cell group (SCG) or the PUCCH-SCell is not configured, multiple TAGs are configured in the UE, SRS transmission of the UE overlaps with SRS transmission in another SC-FDMA symbol of subframe i for a serving cell of another TAG in the SC-FDMA symbol for the serving cell in subframe i of the TAG, and total transmission power for the UE for a sounding reference symbol of an overlapped part exceeds $\hat{P}_{CMAX}(i)$, the UE scales $\hat{P}_{SRS,c}(i)$ for each of SRS SC-FDMA symbols overlapped in serving cell c and subframe i so as to satisfy the following condition.

$$\sum_c w(i) \cdot \hat{P}_{SRS,c}(i) \le \hat{P}_{CMAX}(i)$$

where, $\hat{P}_{SRS,c}(i)$ is the linear value of $P_{SRS,c}(i)$. The $\hat{P}_{CMAX}(i)$ is the linear value of $P_{CMAX}$ defined in subframe i and w(i) is a scaling factor of $\hat{P}_{SRS,c}(i)$ for serving cell c, where 0<w(i)≤1. The w(i) values are the same across serving cells.

If the UE is configured with a LAA SCell for uplink transmissions, the UE may compute the scaling factor w(i) assuming that the UE performs a SRS transmission on the LAA SCell in subframe i irrespective of whether the UE can access the LAA SCell for the SRS transmission in subframe i.

If the UE is configured with higher layer parameter UplinkPowerControlDedicated-v12x0 for serving cell c and if subframe i belongs to uplink power control subframe set 2 as indicated by the higher layer parameter tpc-Subframe-Set-r12, the UE shall use $f_{c,2}(i)$ instead of $f_c(i)$ to determine $P_{SRS,c}(i)$ for subframe i and serving cell c.

Power Headroom for Type3 Report

The UE is not expected to compute a Type 3 report on a slot/subslot.

For serving cell c with frame structure type 2, and not configured for PUSCH/PUCCH transmission, 1) Case where the UE transmits the SRS in subframe i for the serving cell c or 2) case where the UE does not transmit the SRS in the subframe i due to a collision with a physical channel or signal having a higher priority in subframe i+1, and transmits the SRS in subframe i when the physical channel or signal having the higher priority is not generated in subframe i+1 is not generated, The power headroom for Type 3 report is calculated by using the following.

$PH_{type3,c}(i) = P_{CMAX,c}(i) - \{10 \log_{10}(M_{SRS,c}) + P_{O\_SRS,c}(m) + \alpha_{SRS,c} \cdot PL_c + f_{SRS,c}(i)\}$ [dB]

Here, $PL_c$ represents a downlink path loss estimate calculated by the UE for the serving cell c as a unit of dB. The $P_{CMAX,c}(i)$, $M_{SRS,c}$, $P_{O\_SRS,c}(m)$ $\alpha_{SRS,c}$, and $f_{SRS,c}(i)$ are the same as described above.

Otherwise (if 1) and 2) above are not), the power headroom for the Type 3 report is calculated by using the following.

$PH_{type3,c}(i) = \tilde{P}_{CMAX,c}(i) - \{(P_{O\_SRS,c}(l) + \alpha_{SRS,c} \cdot PL_c + f_{SRS,c}(i)\}$ [dB]

Here, $PL_c$ represents a downlink path loss estimate calculated by the UE for the serving cell c as a unit of dB. The $P_{O\_SRS,c}(l)$, $\alpha_{SRS,c}$, and $f_{SRS,c}(i)$ are the same as described above. $\tilde{P}_{CMAX,c}(i)$ is calculated by assuming the SRS transmission in the subframe according to a preconfigured requirement and assuming MPR=0 dB, A-MPR=0 dB, P-MPR=0 dB, and $\Delta T_c$=0 dB. MPR is maximum power reduction, A-MPR is additional maximum power reduction, P-MPR is power management maximum power reduction, and $\Delta T_c$ is tolerance related to transmission power. In this case, the physical layer delivers, to the higher layer, $\tilde{P}_{CMAX,c}(i)$ instead of $P_{CMAX,c}(i)$ Power Headroom Reporting The Power Headroom reporting procedure is used to provide the serving eNB with information about the difference between the nominal UE maximum transmit power and the estimated power for UL-SCH transmission or SRS transmission per activated Serving Cell and also with information about the difference between the nominal UE maximum power and the estimated power for UL-SCH and PUCCH/SPUCCH transmission on SpCell and PUCCH SCell.

The reporting period, delay and mapping of Power Headroom are defined in TS 36.133 and TS 38.133. RRC controls power headroom reporting by performing operations of i) and ii) below. The RRC i) configures two timers (periodicPHR-Timer and prohibitPHR-Timer) and ii) signals dl-PathlossChange for configuring a change in measured downlink pathloss and required power backoff due to power management for triggering the PHR as allowed in P-MPRc.

A Power Headroom Report (PHR) shall be triggered if any of the following events occur.

prohibitPHR-Timer expires or has expired and the path loss has changed more than dl-PathlossChange dB for at least one activated Serving Cell of any MAC entity which is used as a pathloss reference since the last transmission of a PHR in this MAC entity when the MAC entity has UL resources for new transmission;

periodicPHR-Timer expires;

upon configuration or reconfiguration of the power headroom reporting functionality by upper layers which is not used to disable the function;

activation of an SCell of any MAC entity with configured uplink;

addition of the PSCell (i.e. PSCell is newly added or PSCell is changed);

prohibitPHR-Timer expires or has expired, when the MAC entity has UL resources for new transmission, and the following is true in this TTI for any of the activated Serving Cells of any MAC entity with configured uplink:

there are UL resources allocated for transmission or there is a PUCCH/SPUCCH transmission on this cell, and the required power backoff due to power management for this cell has changed more than dl-PathlossChange dB since the last transmission of a PHR when the MAC entity had UL resources allocated for transmission or PUCCH/SPUCCH transmission on this cell.

NOTE 1: The MAC entity should avoid triggering a PHR when the required power backoff due to power management decreases only temporarily (e.g. for up to a few tens of milliseconds) and it should avoid reflecting such temporary decrease in the values of $P_{CMAX,c}$/PH when a PHR is triggered by other triggering conditions.

NOTE 2: If UL HARQ operation is autonomous for the HARQ entity and if the PHR is already included in a MAC PDU for transmission by this HARQ entity, but not yet transmitted by lower layers, it is up to UE implementation how to handle the PHR content.

When there is a UL resource allocated for new transmission for the TTI in the MAC entity, the MAC entity should perform the following.

if it is the first UL resource allocated for a new transmission since the last MAC reset, start periodicPHR-Timer.
if the Power Headroom reporting procedure determines that at least one PHR has been triggered and not cancelled, and;
if the allocated UL resources can accommodate the MAC control element for PHR which the MAC entity is configured to transmit, plus its subheader, as a result of logical channel prioritization:
if extendedPHR is configured:
for each activated Serving Cell with configured uplink:
obtain the value of the Type 1 or Type 3 power headroom.
if the MAC entity has UL resources allocated for transmission on this Serving Cell for this TTI:
obtain the value for the corresponding $P_{CMAX,c}$ field from the physical layer.
if simultaneousPUCCH-PUSCH is configured or a serving cell operating according to Frame Structure Type 3 with uplink is configured and activated:
obtain the value of the Type 2 power headroom for the PCell.
obtain the value for the corresponding $P_{CMAX,c}$ field from the physical layer (see clause 5.1.1.2 of TS 36.213 [2]).
instruct the Multiplexing and Assembly procedure to generate and transmit an Extended PHR MAC control element for extendedPHR as defined in clause 6.1.3.6a based on the values reported by the physical layer.
else if extendedPHR2 is configured:
for each activated Serving Cell with configured uplink:
obtain the value of the Type 1 or Type 3 power headroom.
if the MAC entity has UL resources allocated for transmission on this Serving Cell for this TTI:
obtain the value for the corresponding $P_{CMAX,c}$ field from the physical layer.
if a PUCCH SCell is configured and activated:
obtain the value of the Type 2 power headroom for the PCell and PUCCH SCell.
obtain the values for the corresponding $P_{CMAX,c}$ fields from the physical layer.
else:
if simultaneousPUCCH-PUSCH is configured for the PCell or a serving cell operating according to Frame Structure Type 3 with uplink is configured and activated:
obtain the value of the Type 2 power headroom for the PCell.
obtain the value for the corresponding $P_{CMAX,c}$ field from the physical layer (see clause 5.1.1.2 of TS 36.213).
instruct the Multiplexing and Assembly procedure to generate and transmit an Extended PHR MAC control element for extendedPHR2 according to configured ServCellIndex and the PUCCH(s) for the MAC entity as defined in clause 6.1.3.6a based on the values reported by the physical layer.
else if dualConnectivityPHR is configured:
for each activated Serving Cell with configured uplink associated with any MAC entity:
obtain the value of the Type 1 or Type 3 power headroom.
if this MAC entity has UL resources allocated for transmission on this Serving Cell for this TTI or if the other MAC entity has UL resources allocated for transmission on this Serving Cell for this TTI and phr-ModeOtherCG is set to real by upper layers:
obtain the value for the corresponding $P_{CMAX,c}$ field from the physical layer.
if simultaneousPUCCH-PUSCH is configured or a serving cell operating according to Frame Structure Type 3 with uplink is configured and activated:
obtain the value of the Type 2 power headroom for the SpCell.
obtain the value for the corresponding $P_{CMAX,c}$ field for the SpCell from the physical layer (see clause 5.1.1.2 of TS 36.213 [2]).
if the other MAC entity is E-UTRA MAC entity:
obtain the value of the Type 2 power headroom for the SpCell of the other MAC entity.
if phr-ModeOtherCG is set to real by upper layers:
obtain the value for the corresponding $P_{CMAX,c}$ field for the SpCell of the other MAC entity from the physical layer (see clause 5.1.1.2 of TS 36.213 [2]).
instruct the Multiplexing and Assembly procedure to generate and transmit a Dual Connectivity PHR MAC control element as defined in clause 6.1.3.6b based on the values reported by the physical layer.
else:
obtain the value of the Type 1 power headroom from the physical layer.
instruct the Multiplexing and Assembly procedure to generate and transmit a PHR MAC control element as defined in clause 6.1.3.6 based on the value reported by the physical layer.
start or restart periodicPHR-Timer.
start or restart prohibitPHR-Timer.
cancel all triggered PHR(s).

Power Headroom Report MAC Control Element

The Power Headroom Report (PHR) MAC control element is identified by a MAC PDU subheader with LCID. Hereinafter, the PHR MAC CE will be described with reference to FIG. 9.

FIG. 9 illustrates a PHR MAC control element to which a method proposed in the present disclosure may be applied. Referring to FIG. 9, the PHR MAC control element has a fixed size and is constituted by a single octet defined as follows.

R: reserved bit, set to "0";
Power Headroom (PH): this field indicates the power headroom level. The length of the field is 6 bits. The reported PH and the resulting power headroom level are illustrated in Table 3 below.

TABLE 3

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

Hereinafter, an MAC CE related to an extended power headroom report (PHR) will be described with reference to FIGS. 10A and 10B.

FIGS. 10A and 10B illustrates an example of an extended PHR MAC CE to which a method proposed by the present disclosure may be applied. FIGS. 10C and 10D illustrates another example of the extended PHR MAC CE to which a method proposed by the present disclosure may be applied.

Extended Power Headroom Report MAC Control Element

In the case of extendedPHR, the extended power headroom report MAC control element is identified by an MAC PDU subheader with a designated LCID. A size of the extended power headroom report control element is variable and is defined in FIGS. 10A and 10B. When the Type 2 PH is reported, an octet including a Type 2 PH field is included earlier than an octet which represents existence of a PH per SCell and followed by an octet including a related $P_{CMAX,c}$ field (if reported). Then, an octet is subsequent which has a field $P_{CMAX,c}$ (if reported) associated with an octet with the Type 1 PH field for PCell. Then, an octet is subsequent, which has a field $P_{CMAX,c}$ (if reported) associated with a field Type x PH for each SCell shown in a bitmap in ascending order based on ServCellIndex as designated in TS 36.331. Here, x is equal to 3 if ul-Configuration-r14 is configured for the SCell and x is equal to 1 if not (if ul-Configuration-r14 is not configured).

In the case of extendedPHR2, the extended power headroom report (PHR) MAC control element is identified by an MAC PDU subheader with a designated LCID. The PHR MAC control element has a variable size and is defined in FIG. 10B, FIG. 10C, and FIG. 10D. FIG. 10B illustrates the extended PHR MAC CE supporting the PUCCH in the SCell. FIG. 10C illustrates the extended PHR MAC CE supporting 32 cells in which uplink is configured. FIG. 10D illustrates the extended PHR MAC CE supporting the PUCCH in the SCell and 32 cells in which the uplink is configured.

One octet with C fields is used for indicating the presence of PH per SCell when the highest SCellIndex of SCell with configured uplink is less than 8, otherwise four octets are used. When Type 2 PH is reported for the PCell, the octet containing the Type 2 PH field is included first after the octet(s) indicating the presence of PH per SCell and followed by an octet containing the associated $P_{CMAX,c}$ field (if reported). Then follows the Type 2 PH field for the PUCCH SCell (if PUCCH on SCell is configured and Type 2 PH is reported for the PUCCH SCell), followed by an octet containing the associated $P_{CMAX,c}$ field (if reported). Then follows an octet with the Type 1 PH field and an octet with the associated $P_{CMAX,c}$ field (if reported), for the PCell. Then follows in ascending order based on the ServCellIndex, as specified in TS 36.331 an octet with the Type x PH field, and an octet with the associated $P_{CMAX,c}$ field (if reported), for each SCell indicated in the bitmap. wherein, x is equal to 3 when the ul-Configuration-r14 is configured for this SCell, x is equal to 1 otherwise.

The Extended PHR MAC Control Elements are defined as follows.

- $c_i$: this field indicates the presence of a PH field for the SCell with SCellIndex i as specified in TS 36.331 [8]. The C; field set to "1" indicates that a PH field for the SCell with SCellIndex i is reported. The C; field set to "0" indicates that a PH field for the SCell with SCellIndex i is not reported.
- R: reserved bit, set to "0".
- V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH/ SPUCCH and V=1 indicates that a PUCCH/SPUCCH reference format is used. For Type 3 PH, V=0 indicates real transmission on SRS and V=1 indicates that an SRS reference format is used. Furthermore, for Type 1, Type 2 and Type 3 PH, V=0 indicates the presence of the octet containing the associated $P_{CMAX,c}$ field, and V=1 indicates that the octet containing the associated $P_{CMAX,c}$ field is omitted.
- Power Headroom (PH): this field indicates the power headroom level. The length of the field is 6 bits. The reported PH and the corresponding power headroom levels are shown in Table 3 (the corresponding measured values in dB can be found in clause 9.1.8.4 of TS 36.133).
- P: this field indicates whether the MAC entity applies power backoff due to power management (as allowed by P-MPR$_c$, see TS 36.101 [10]). The MAC entity shall set P=1 if the corresponding $P_{CMAX,c}$ field would have had a different value if no power backoff due to power management had been applied.
- $P_{CMAX,c}$: if present, this field indicates the $P_{CMAX,c}$ or $\tilde{P}_{CMAX,c}$ as specified in TS 36.213 [2] used for calculation of the preceding PH field. The reported $P_{CMAX,c}$ and the corresponding nominal UE transmit power levels are shown in Table 4 (the corresponding measured values in dBm can be found in clause 9.6.1 of TS 36.133).

Table 4 below illustrates a nominal UE transmit power level for the extended PHR and a dual connectivity PHR.

TABLE 4

| $P_{CMAX,c}$ | Nominal UE transmit power level |
| --- | --- |
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

Hereinafter, an agreement related to LTE MIMO enhancement (additional SRS) that may be applied to the method proposed in the disclosure is described.

1. Agreement (scenarios considered for additional SRS)

The work for additional SRS symbols in this WI should consider the following scenarios TDD for non-CA TDD only CA

FDD-TDD CA

2. Agreement (position in time domain of additional SRS symbol)

Positions in the time domain of additional SRS symbols possible in one general UL subframe for a cell include:

Option 1: Use all symbols in one slot for SRS from a cell perspective

For example, another slot of the subframe may be used for PUSCH transmission for an sTTI capable UE.

Option 2: Use all symbols in one subframe for SRS from a cell perspective

Option 3: A subset of symbols in one slot may be used for SRS from a cell perspective However, the position of the additional SRS is not limited to the above-described options.

For an area with a low downlink SINR, support of an additional SRS symbol per UE in a normal subframe may bring a gain in downlink performance.

3. Agreement (aperiodic SRS support)

Aperiodic SRS transmission may be supported for additional SRS symbols.

4. Agreement (transmission of additional SRS)

A UE configured with an additional SRS in one UL subframe may transmit the SRS based on any one of the following options.

Option 1: Frequency hopping is supported within one UL subframe.
Option 2: Repetition within one UL subframe is supported.
Option 3: Both frequency hopping and repetition are supported within one UL subframe.

5. Agreement

Both intra-subframe frequency hopping and repetition are supported for aperiodic SRS in additional symbols).

6. Agreement (additional SRS and antenna switching)

Antenna switching within a subframe is supported for aperiodic SRS in an additional SRS symbol.

The term additional SRS symbol is additionally introduced in Rel-16 and the last symbol is not part of the additional SRS symbol.

7. Agreement (transfer of legacy SRS and additional SRS)

Both legacy SRS and additional SRS symbol(s) may be configured for the same UE.

If the legacy SRS is aperiodic, the UE may transmit the legacy SRS or additional SRS symbol(s) in the same subframe.

If the legacy SRS is periodic, the UE may transmit the legacy SRS and additional SRS symbol(s) in the same or different subframes.

8. Agreement (number of symbols in additional SRS)

The number of symbols that may be configured in the UE as an additional SRS is 1-13.

In the future, the following contents may be considered in relation to agreements.

For intra-subframe frequency hopping and repetition of additional SRS symbols)

In the support of repetition and frequency hopping, the following contents may be discussed.

A value $n_{SRS}=\lfloor l/R \rfloor$. In this case, $l \in \{0, 1, \ldots, N_{symb}^{SRS}-1\}$ is an OFDM symbol number.

A value of $N_{symb}^{SRS}$. In this case, $N_{symb}^{SRS}$ is the number of configured SRS symbols, and R is a repetition factor for a configured UE.

An Application to an Aperiodic SRS

Whether legacy SRS and additional SRS symbols have the same hopping pattern

Whether flexible configuration (e.g., comb/comb offset configuration) is supported for repetition of additional SRS symbols).

9. Agreement

For the temporal position of possible additional SRS (SRS) symbols in one general UL subframe for a cell:

use 1 to 13 symbols in one subframe for SRS from a cell point of view

10. Agreement (power control)

Same power control configuration applies for all additional SRS symbols configured to a single UE.

11. Agreement

Transmission of aperiodic legacy SRS and aperiodic additional SRS symbol(s) in the same subframes for a UE is supported.

12. Agreement

In the case of aperiodic SRS transmission, a combination of the following characteristics may be simultaneously configured.

Intra-subframe antenna switching
Antenna switching is supported through at least all antenna ports.

Whether to support next contents may be additionally considered.

Antenna switching across a subset of antenna ports
Frequency hopping within a subframe
Intra-subframe repetition
Whether the aforementioned characteristics are applied to only an additional SRS symbol or also applied to a legacy SRS symbol may be considered.

13. Agreement

In supporting the repetition $n_{SRS}=\lfloor l/R \rfloor$ of an SRS, the following parameter may be defined. In this case, $l \in \{0, 1, \ldots, N_{symb}^{SRS}-1\}$ is an OFDM symbol number, $N_{symb}^{SRS}$ is the number of configured SRS symbols, and R is a repetition factor for a configured UE.

14. Agreement

A configurable number of additional SRS repetitions may be 1, 2, 3, 4, 6, 7, 8, 9, 12, 13). The corresponding configuration may be applied per antenna port and per subband.

15. Agreement (trigger of SRS transmission through a codepoint of DCI)

A codepoint of the same DCI triggers SRS transmission for one of the followings.

Only aperiodic legacy SRS symbols
Only aperiodic additional SRS symbols
Both aperiodic legacy and aperiodic additional SRS symbols within the same subframe The association of the codepoint and one of the above may be configured by RRC signaling. If SRS triggering is not present, a separate codepoint may be supported.

16. Agreement

The size of an SRS request field for triggering an Rel-16 SRS may be the same as the existing (Rel-15 DCI format).

17. Agreement

Only Rel-15 DCI formats that support SRS triggering can be used to trigger Rel-16 SRS transmission.

18. Agreement

In the case of an additional SRS symbol, per-symbol group hopping and sequence hopping may be supported.

In a given time, only one of per-symbol group hopping or sequence hopping can be used by a UE.

19. Agreement

In order to solve at least power change attributable to frequency hopping or antenna switching for an additional SRS symbol, one of the following options may be considered.

Option 1: A guard period of one symbol may be introduced into RAN1 spec.
Option 2: A guard period may not be introduced into RAN1 spec.

20. Agreement

A guard period may be configured for frequency hopping and antenna switching of an additional SRS symbol.

When the guard period is configured, the corresponding guard period is 1 OFDM symbol.
FFS: When repetition in the subframe is not configured, whether the guard period for the frequency hopping and/or the antenna switching is to be continuously configured needs to be determined.

The following matter may be considered.

Since the frequency hopping/repetition in the subframe and the antenna switching in the subframe are simultaneously configured, the frequency hopping should be performed before the antenna switching.

Legacy SRS symbols may follow a legacy configuration.

21. Agreement

An aperiodic additional SRS may be triggered only for transmission in a subframe which belongs to a legacy UE-specific SRS subframe configuration.

22. Agreement

When there is no legacy SRS transmission at least on the subframe, at least independent open-loop power control of the additional SRS symbol is supported from the legacy SRS symbol.

When the additional SRS symbol and the legacy SRS symbol are transmitted in the same subframe, the power control for the SRS symbol needs to be additionally examined.

23. Agreement

Sequence generation of the additional SRS symbol may be based on the following.

$$f_{gh}(n_s, l) = \begin{cases} 0 & \text{if group hopping is disabled} \\ \left(\sum_{i=0}^{7} c(8(n_s N_{symb} + l) + i) \cdot 2^i\right) \bmod 30 & \text{if group hopping is enabled} \end{cases}$$

$$v = \begin{cases} c(n_s N_{symb} + l) & \text{if group hopping is disabled and sequence hopping is enabled} \\ 0 & \text{otherwise} \end{cases}$$

Here, l may represent an absolute symbol index in slot $\lfloor n_s/2 \rfloor$, and Nsymb may represent the number of OFDM symbols per slot.

24. Agreement

Any one of Alt 1 to Alt 4 below may be selected for collision handling of SRS and PUCCH/PUSCH transmission.

Alt1: Using sPUSCH and/or sPUCCH

An sPUSCH and/or sPUCCH function for Rel-16 UE which enables sPUSCH and/or sPUCCH transmission is introduced in the SRS subframe.

Multiplexing of sTTI on same subframe and same PRBs with additional SRS on symbols where SRS is not transmitted is supported.

Alt2: When the SRS collides with the PUCCH/PUSCH/PRACH in the same carrier, the UE drops or delays the SRS transmission in the additional symbol.

Any one operation of the drop and the delay may be performed.

Alt3: The UE does not expect that the aperiodic SRS will be triggered in the additional symbol of the SRS which collides with the PUCCH/PUSCH/PRACH in the same carrier.

The collision may be considered in interband-CA and intraband-CA.

Alt4: A operation for handling the corresponding collision may be based on eNB/UE implementation.

The sPUSCH and/or the sPUCCH may be used for handling the collision between the SRS and the PUCCH/PUSCH.

The introduction of the sPUSCH and/or sPUCCH function for the Rel-16 UE which enables the sPUSCH and/or sPUCCH transmission may be considered in the SRS subframe.

The following matter may be additionally considered.

Any one operation of the following operations may be selected in order to handle the collision of the SRS and the PUCCH/PUSCH transmission for a UE which does not support the sPUSCH/sPUCCH.

Alt2A: When the SRS collides with the PUCCH/PUSCH/PRACH in the same carrier, the UE may delay the SRS transmission in the additional symbol.

Alt2B: When the SRS collides with the PUCCH/PUSCH/PRACH in the same carrier, the UE drops the SRS transmission in the additional symbol.

Alt3: The UE does not expect that the aperiodic SRS will be triggered in the additional symbol of the SRS which collides with the PUCCH/PUSCH/PRACH in the same carrier.

Specific contents for a collision situation of interband-CA and intraband-CA may be determined.

Alt4: The operation for handling the corresponding collision may be based on the eNB implementation.

There is no agreement for periodic SRS transmission supporting in the additional symbol for Rel-16.

25. Agreement

The guard period for the frequency hopping and/or antenna switching may be configured regardless a repetition configuration in the subframe.

Introducing the UE capability for UEs not requiring the guard period depends on RAN 4. When the UE capability is introduced, whether a separate UE capability for the frequency hopping and the antenna switching is to be provided also depends on RAN 4.

26. Agreement

When there is no legacy SRS transmission at least on the subframe, the independent close-loop power control of the additional SRS symbol is supported from the legacy SRS symbol.

27. Agreement

When there is no legacy SRS transmission at least on the subframe, the independent close-loop power control of the additional SRS symbol is supported from the legacy SRS symbol.

28. Agreement

An initialization seed $c_{init}$ for the same (u, v) as designated in LTE release 15 may become a virtual cell ID as one modification related to $n_{ID}^{RS}$.

29. Agreement

When a gap symbol is configured, the gap symbol is not included in a configured SRS symbol $N_{symb}^{SRS}$ and the number of repetition coefficients, R.

There is no agreement for antenna switching supporting over subsets of the antenna port in one subframe in Rel-16.

30. Agreement

Power control for SRS symbol when the additional SRS symbol and the legacy SRS symbol are transmitted in the same subframe:

Each of the additional SRS and the legacy SRS follows autonomous transmission power control.

When the additional SRS and the legacy SRS symbol are adjacent to each other, a gap between the additional SRS and the legacy SRS symbol need to be considered.

In Rel-16 LTE MIMO enhancement (in particular, in massive MIMO of a TDD configuration), a capacity and coverage of the SRS are determined to be enhanced in order to more effectively utilize DL/UL channel reciprocity.

Specifically, even in a normal UL subframe in addition to a special subframe of the LTE TDD system, a multi-symbol SRS may be introduced. At present, in one uplink subframe, the multi-symbol SRS may be configured in 1 symbol to 13 symbols which are other than the legacy SRS (other than the last symbol) from the viewpoint of the cell or the UE.

Further, objects of the legacy SRS are UL channel information acquisition and UL link adaptation. On the contrary, objects of the additional SRS are enhancing the capacity and the coverage in SRS transmission for DL channel acquisition.

Based on a difference in terms of the object, it is agreed that the power control configuration of a separate additional SRS from the legacy SRS is supported in an open-loop power control parameter and a closed-loop power control mechanism.

In the case of closed-loop power control controlled by a transmit power control (TPC) command of the BS, information regarding which degree of headroom (e.g., a value acquired by subtracting UL channel power which is currently transmitted from maximum power, i.e., which degree of reserve power remains for transmission of the signal) for UL channel power may be required.

However, in a current standard point of view, power control for the legacy SRS depends on a PUSCH power control mechanism and the power headroom report (PHR) is also performed through the PUSCH PHR. Further since the legacy Type 3 PHR is a PHR for the carrier switching SRS transmitted in a DL dedicated serving cell in which the PUSCH and the PUCCH are not scheduled, a PHR for the additional SRS (i.e., the multi symbol SRS in the normal UL subframe) in the Rel-16 LTE MIMO needs to be separately performed. Only when the separate PHR for the additional SRS should be performed, the BS may indicate a TPC command which is suitable for a power headroom situation of the additional SRS of the UE.

Therefore, in the present disclosure, by considering such a problem, a method of a power control configuration for the additional SRS between the BS and the UE and a power headroom report for the additional SRS of the UE is proposed, and a UE operation based on the corresponding configuration is described.

In the present disclosure, for convenience, the method is described based on the additional SRS in the LTE system, but this may be applied to all systems that transmit the SRS in a plurality of symbols, such as 3GPP new radio access technology (RAT), etc. Moreover, when the present disclosure is applied in the NR, subframe and slot structures/units of the LTE system may be modified and applied as in Table 5 below in the NR system (i.e., the number of symbols per slot, the number of symbols per frame, and the number of symbols per subframe according to parameter p related to subcarrier spacing).

TABLE 5

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Further, in the present disclosure, a UE that supports the transmission of the additional SRS will be referred to as an enhanced UE.

The contents described above may be applied in combination with methods proposed in the present disclosure to be described below or may be supplemented to clarify technical features of the methods proposed in the present disclosure. Methods to be described below are just distinguished for convenience and it is needless to say that some components of any one method may be substituted with some components of another method or may be applied in combination with each other.

[Method 1]

Hereinafter, a method related to a configuration and an indication of the TPC command for the additional SRS of the enhanced UE of the BS will be described.

[Proposal 1]

In the TPC command of the BS for the closed-loop power control for the additional SRS, the BS may indicate, to the UE, the power control for the additional SRS in a form of enhancing a TPC command field of DCI format 3B.

Hereinafter, matters related to DCI format 3B will be described.

DCI format 3B is used for transmission of groups of TPC commands for SRS transmission by one or more UEs. An SRS request may also be transmitted jointly with the TPC command.

The following information is transmitted through DCI format 3B.

Block number 1, block number 2, . . . , block number

Here, a start location of the block is determined by parameter startingBitOfFormat3B provided in the higher layer to a UE in which the corresponding block is configured.

When there are five or more TDD SCells configured without the PUCCH and the PUSCH in the UE, one block is configured for the UE by the higher layer and the following field is defined for the corresponding block.

SRS request): 0 or 2 bits.

TPC command number 1, TPC command number 2, . . . , TPC command number n n TPC command fields correspond to n TDD SCell sets without the PUCCH and the PUSCH, and the set is displayed by the SRS request field or determined by the higher layer when there is no SRS request field. When a value of the parameter fieldTypeFormat3B provided in the higher layer is 1 or 3, the TPC command field has 1 bit and when the value of the parameter fieldTypeFormat3B is 2 or 3, the TPC command field has 2 bits.

When the UE has up to 5 TDD SCells configured without the PUCCH and the PUSCH, one or more blocks corresponding to the SCells, respectively are constituted by the higher layer, and the following field is defined for each block.

SRS request: 0, 1, or 2 bits

TPC command: 1 or 2 bits. When the value of the parameter fieldTypeFormat3B provided in the higher layer is 1 or 3, the bit number 1 and when the value of the parameter fieldTypeFormat3B is 2 or 4, the bit number is 2.

The size of DCI format 3B is equal to $L_{format0}$, and here, $L_{format\ 0}$ is equal to a payload size of DCI format 0 before CRC attachment when DCI format 0 is mapped to a common search space by including an added padding bit in DCI format 0.

The legacy DCI format 3B is a DCI format that may indicate the TPC command for the SRS for a carrier switching usage transmitted in a DL dedicated serving cell in which the PUSCH and the PUCCH are not scheduled (i.e., TDD SCells configured without PUCCH and without PUSCH).

Multiple blocks are present in a DCI payload to include TPC commands for multiple UEs. Specifically, when any UE performs blind detection of DCI format 3B through TPC-RNTI of the corresponding UE (accurately srs-TPC-RNTI), the UE may recognize which block among multiple blocks is a block of the corresponding UE (thereof) through the parameter startingBitOfFormat3B. The UE may operate by transmitting Type 1 SRS or receiving the TPC indication for the closed-loop power control based on the SRS request field (optional) and the TPC command in the corresponding block.

[Proposal 1-1]

A method for configuring a separate parameter to announce in which block in the DCI payload the TPC command is present may be considered.

Specifically, in the closed-loop power control for the additional SRS, the TPC command field of DCI format 3B is utilized for the TPC command, but in which block in the DCI payload the TPC command for the additional SRS may be indicated by configuring a separate higher layer parameter (e.g., such as startingBitOfFormat3B_additionalSRS) in addition to the startingBitOfFormat3B.

That is, the enhanced UE may simultaneously receive a TPC command for the SRS of a PUSCH-less SCell (SCell in which the PUSCH and the PUCCH are not configured) and a TPC command for the additional SRS in a normal UL subframe by decoding one DCI format 3B, and apply each TPC command to the (closed-loop) power control.

An example of the RRC configuration of the proposal is illustrated in Tables 6 and 7 below (e.g., startingBitOfFormat3B_additionalSRS).

startingBitOfFormat3B indicating the location of the TPC command for the SRS of the PUSCH-less SCell and startingBitOfFormat3B_additionalSRS indicating the location of the TPC command for the additional SRS may also be present optionally present. Both two parameters may be present or only one parameter may be present, but both parameters may not be required to be present (the reason is that it is more advantageous to set the parameter as null by releasing SRS-TPC-PDCCH-Config itself therethan).

Moreover, a separate higher layer parameter may be present in order to designate a cell to which the TPC of the additional SRS is to be applied. For example, since PCell which is not handled in the legacy DCI format 3B or SCell with the PUSCH may be designated through the separate higher layer parameter, the BS may indicate the TCP command for the additional SRS in the PCell or the SCell with the PUSCH (e.g., see Table 6 below for srs-CC-SetIndexlist-additionalSRS/SRS-CC-SetIndex-additionalSRS/cc-SetIndex-additionalSRS/cc-IndexInOneCC-Set-additionalSRS).

TABLE 6

| SRS-TPC-PDCCH-Config information element |
| --- |
| SRS-TPC-PDCCH-Config-r14 ::= CHOICE {<br>   release                         NULL,<br>   setup                          SEQUENCE {<br>      srs-TPC-RNTI-r14                           BIT STRING (SIZE (16)),<br>      startingBitOfFormat3B-r14                INTEGER (0..31), (OPTIONAL)<br>      startingBitOfFormat3B-additionalSRS     INTEGER (0..31), (OPTIONAL)<br>      fieldTypeFormat3B-r14                    INTEGER (1..4),<br>      srs-CC-SetIndexlist-r14                  SEQUENCE (SIZE(1..4)) OF SRS-CC-SetIndex-r14<br>      OPTIONAL -- Cond SRS-Trigger-TypeA<br>      srs-CC-SetIndexlist-additionalSRS     SEQUENCE (SIZE(1..4)) OF SRS-CC-SetIndex-additionalSRS            OPTIONAL<br>   }<br>}<br>SRS-CC-SetIndex-r14 ::= SEQUENCE {<br>   cc-SetIndex-r14                          INTEGER (0..3),<br>   cc-IndexInOneCC-Set-r14                 INTEGER (0..7)<br>}<br>SRS-CC-SetIndex-additionalSRS ::= SEQUENCE {<br>   cc-SetIndex-additionalSRS              INTEGER (0..3),<br>   cc-IndexInOneCC-Set-additionalSRS     INTEGER (0..7)<br>} |

Alternatively, when the BS indicates the TPC command through DCI format 3B, the UE may also follow the following RRC configuration structure in order to configure whether only the TPC command for the SRS of the PUSCH-less SCell may be read, ii) whether only the TPC command for the additional SRS in the normal UL subframe may be read, iii) whether both TPC commands may be read, or iv) whether both TPC commands may not be read (i.e., any one of startingBitOfFormat3B or startingBitOfFormat3B_additionalSRS is released and configured as a null value) (e.g., SRS-TPC-PDCCH-Config-r16).

Similarly even in this case, the separate higher layer parameter may be present in order to designate the cell to which the TPC of the additional SRS is to be applied. For example, since PCell which is not handled in the legacy DCI format 3B or SCell with the PUSCH may be designated through the separate parameter, the BS may indicate the TCP command for the additional SRS in the PCell or the SCell with the PUSCH (e.g., see Table 7 below for srs-CC- SetIndexlist-additionalSRS/SRS-CC-SetIndex-addition-alSRS/cc-SetIndex-additionalSRS/cc-IndexlnOneCC-Set-additionalSRS).

TABLE 7

SRS-TPC-PDCCH-Config information element

```
SRS-TPC-PDCCH-Config-r14 ::= CHOICE {
   release                      NULL,
   setup                        SEQUENCE {
      srs-TPC-RNTI-r14                    BIT STRING (SIZE (16)),
      startingBitOfFormat3B-r14           INTEGER (0..31),
      fieldTypeFormat3B-r14               INTEGER (1..4),
      srs-CC-SetIndexlist-r14             SEQUENCE (SIZE(1..4)) OF SRS-
CC-SetIndex-r14
      OPTIONAL -- Cond SRS-Trigger-TypeA
   }
}
SRS-TPC-PDCCH-Config-r16 ::= CHOICE {
   release                      NULL,
   setup                        SEQUENCE {
      ...
      startingBitOfFormat3B-additionalSRS    INTEGER (0..31),
      srs-CC-SetIndexlist-additionalSRS      SEQUENCE (SIZE(1..4)) OF SRS-CC-
SetIndex-additionalSRS         OPTIONAL
      ...
   }
}
SRS-CC-SetIndex-r14 ::= SEQUENCE {
   cc-SetIndex-r14                     INTEGER (0..3),
   cc-IndexInOneCC-Set-r14             INTEGER (0..7)
}
SRS-CC-SetIndex-additionalSRS ::= SEQUENCE {
   cc-SetIndex-additionalSRS           INTEGER (0..3),
   cc-IndexInOneCC-Set-additionalSRS   INTEGER (0..7)
}
```

According to the configuration for the closed-loop power control and the TPC command configuration/indication structure of Proposal 1-1, there is the following effect.

The BS may indicate a separate closed-loop power control command for an additional SRS having a object (e.g., DL/UL reciprocity based DL channel information acquisition, and SRS capacity and coverage securing) different from the legacy SRS or the SRS of the PUSCH-less SCell. Further, the BS adds some parameters in the legacy RRC structure without the need for performing an unnecessary RRC configuration, and as a result, the UE may receive the TPC command for the additional SRS and perform the power control operation through the legacy DCI format 3B. Further, there is an advantage in that DCI format 3B is enhanced and extensively applied, and as a result, the BS may indicate the TPC command for the additional SRS over multi-cells in a carrier aggregation (CA) situation of the UE.

[Proposal 1-2]

A method for configuring additional RNTI in addition the srs-TPC-RNTI in order to decode the TPC command may be considered.

Specifically, the BS may utilize the TPC command field of format 3B for the TPC command in the closed-loop power control for the additional SRS, but may configure, in the enhanced UE, separate RNTI such as additionalsrs-TPC-RNTI for decoding the TPC command for the additional SRS in addition to the srs-TPC-RNTI for decoding the TPC command for the SRS of the legacy PUSCH-less SCell.

That is, the enhanced UE performs blind detection through two RNTIs for one DCI format 3B to acquire/detect each of the TPC command for the SRS of the PUSCH-less SCell and the TPC command for the additional SRS in the normal UL subframe, and apply each TPC command to the (closed-loop) power control.

An example of the RRC configuration of the proposal is illustrated in Table 8 below (e.g., SRS-TPC-PDCCH-Config-r16/srs-TPC-RNTI-additionalSRS/startingBitOfFormat3B-r14, etc.)

In Proposal 1-2, since the TPC RNTI for the SRS of the PUSCH-less SCell and the TPC RNTI for the additional SRS are separately configured, there is an advantage in that the startingBitOfFormat3B for the additional SRS usage need not be separately indicated and the legacy format may be shared and utilized unlike Proposal 1-1. In other words, in Proposal 1-1, one UE occupies two blocks in DCI format 3B, and as a result, the DCI payload may also be wasted, but in Proposal 1-2, the waste may be reduced and for which SRS the corresponding TPC command is a TPC command may be recognized with the RNTI.

Similarly even in this case, the separate higher layer parameter may be present in order to designate the cell to which the TPC of the additional SRS is to be applied. For example, since PCell which is not handled in the legacy DCI format 3B or SCell with the PUSCH may be designated through the separate higher layer parameter, the BS may indicate the TCP command for the additional SRS in the PCell or the SCell with the PUSCH (e.g., srs-CC-SetIndexlist-additionalSRS/SRS-CC-SetIndex-additionalSRS/cc-SetIndex-additionalSRS/cc-IndexlnOneCC-Set-additionalSRS, etc.).

TABLE 8

SRS-TPC-PDCCH-Config information element

```
SRS-TPC-PDCCH-Config-r14 ::= CHOICE {
   release                   NULL,
   setup                     SEQUENCE {
      srs-TPC-RNTI-r14                    BIT STRING (SIZE (16)),
      startingBitOfFormat3B-r14           INTEGER (0..31),
      fieldTypeFormat3B-r14               INTEGER (1..4),
      srs-CC-SetIndexlist-r14             SEQUENCE (SIZE(1..4)) OF SRS-
CC-SetIndex-r14
   OPTIONAL -- Cond SRS-Trigger-TypeA
   }
}
SRS-TPC-PDCCH-Config-r16 ::= CHOICE {
   release                   NULL,
   setup                     SEQUENCE {
      ...
      srs-TPC-RNTI-additionalSRS           BIT STRING (SIZE (16)),
      startingBitOfFormat3B-r14            INTEGER (0..31),
      srs-CC-SetIndexlist-additionalSRS    SEQUENCE (SIZE(1..4)) OF SRS-CC-
SetIndex-additionalSRS          OPTIONAL
      ...
   }
}
SRS-CC-SetIndex-r14 ::= SEQUENCE {
   cc-SetIndex-r14                      INTEGER (0..3),
   cc-IndexInOneCC-Set-r14              INTEGER (0..7)
}
SRS-CC-SetIndex-additionalSRS ::= SEQUENCE {
   cc-SetIndex-additionalSRS            INTEGER (0..3),
   cc-IndexInOneCC-Set-additionalSRS    INTEGER (0..7)
}
```

According to the configuration for the closed-loop power control and the TPC command configuration/indication structure of Proposal 1-2, there is the following effect.

The BS may indicate a separate closed-loop power control command for an additional SRS having a different object (e.g., DU/UL reciprocity based DL channel information acquisition, and SRS capacity and coverage securing) different from the legacy SRS or the SRS of the PUSCH-less SCell. The UE is granted with an additional RNTI in the legacy RRC structure without the unnecessary RRC configuration to receive the TPC command for the additional SRS and perform the power control through the legacy DCI format 3B. Further, there is an advantage in that DCI format 3B is enhanced and extensively applied, and as a result, the BS may indicate the TPC command for the additional SRS over multi-cells in the CA situation of the UE.

[Method 2]

Hereinafter, a method for the power headroom report (PHR) for the additional SRS of the enhanced UE will be described.

[Proposal 1]

The following method may be considered for the power headroom report for the additional SRS.

As proposed in Method 1, in the closed-loop power control in addition to the open-loop power control, the enhanced UE may operate according to a separate process (from the legacy SRS or the SRS of the PUSCH-less SCell) for the additional SRS.

Even in the power headroom report (PHR) of the enhanced UE, a separate PHR process may be required, which is different from legacy PH type 1 (PUSCH (=legacy SRS)), type 2 (PUCCH) and type 3 (the SRS of the PUSCH-less SCell).

Basically, the PHR of the UE is reported to the BS through the MAC CE, and there are two cases such as a report through a timer and triggering and reporting the PHR based on a specific condition.

The specific condition may include a case where a path-loss vale for an RS configured is to be changed to a specific value (e.g., a specific threshold) or more in the (open loop) power control process (see TS 36.321 section 5.4.6).

Further, PHR transmission may be performed as follows. In the case of the PHR (in the case of the extendedPHR), type 1/2/3 PH may be transmitted (reported). Further, type 1 and type 2 are mandatorily reported, and the UE additionally reports a PH which is based on at least one of type 1, type 2, or type 3 for the SCell according to the CA situation. PH calculation for each type may follow the legacy scheme (e.g., Section 5.1 of TS 36.213).

Hereinafter, the power headroom report for the additional SRS will be proposed.

[Proposal 1-1]

In the case of the power headroom report for the additional SRS, the legacy Type 3 power headroom report may be enhanced and utilized.

In this case, the following calculation equation for the type 3 PH may be utilized for the PH calculation for the additional SRS (parameters such as $P_{O\_SRS,c}(1)$ $\alpha_{SRS,c}$, $f_{SRS,c}(i)$, etc., may be applied as the parameters of the additional SRS other than the parameters of the SRS of the PUSCH-less SCell).

The following contents are the same as described above in the power headroom for the Type 3 report.

It is not expected that the UE calculates the Type 3 report for a slot/a sub slot.

In case of serving cell c in which the frame structure type is 2 and PUSCH/PUCCH transmission is not configured, 1) Case where the UE transmits the SRS in subframe i for the serving cell c or 2) case where the UE does not transmit the SRS in the subframe i due to a collision with a physical channel or signal having a higher priority in subframe i+1, and transmits the SRS in subframe i when the physical channel or signal having the higher priority is not generated in subframe i+1 is not generated, The power headroom for Type 3 report is calculated by using the following.

$$PH_{type3,c}(i) = P_{CMAX,c}(i) - \{10 \log_{10}(M_{SRS,c}) + P_{O\_SRS,c}(m) + \alpha_{SRS,c} \cdot PL_c + f_{SRS,c}(i)\}[dB]$$

Here, $PL_c$ represents a downlink path loss estimate calculated by the UE for the serving cell c as a unit of dB. The $P_{CMAX,c}(i)$, $M_{SRS,c}$, $P_{O\_SRS,c}(m)$, $\alpha_{SRS,c}$, and $f_{SRS,c}(i)$ are the same as described above.

Otherwise (if 1) and 2) above are not), the power headroom for the Type 3 report is calculated by using the following.

$$PH_{type3,c}(i) = \tilde{P}_{CMAX,c}(i) - \{P_{O\_SRS,c}(l) + \alpha_{SRS,c} \cdot PL_c + f_{SRS,c}(i)\}[dB]$$

Here, $PL_c$ represents a downlink path loss estimate calculated by the UE for the serving cell c as a unit of dB. The $P_{O\_SRS,c}(l)$, $\alpha_{SRS,c}$, and $f_{SRS,c}(i)$ are the same as described above. $\tilde{P}_{CMAX,c}(i)$ $\tilde{P}_{CMAX,c}(i)$ is calculated by assuming the SRS transmission in the subframe according to a preconfigured requirement and assuming MPR=0 dB, A-MPR=0 dB, P-MPR=0 dB, and $\Delta T_c$=0 dB. MPR is maximum power reduction, A-MPR is additional maximum power reduction, P-MPR is power management maximum power reduction, and $\Delta T_c$ is tolerance related to transmission power. In this case, the physical layer delivers, to the higher layer, $P_{CMAX,c}(i)$ instead of $\tilde{P}_{CMAX,c}(i)$.

In this case, in the PH report through the timer and the PH report based on the specific condition, the UE may utilize a container of an MAC PDU for the type 3 PH report of the legacy MAC standard. The BS may configure, in the UE, whether a target to which the PH is reported through an additional higher layer configuration is the SRS of the PUSCH-less SCell or the additional SRS reported through the legacy type 3. That is, the PH report for the additional SRS may be reported to the PCell and the SCell in the type 3 PH report through the higher layer configuration.

When the UE transmits the PHR as described above, the corresponding UE may report the PH for the SRS of the PUSCH-less SCell in the type 3 PH report or report the PH for the additional SRS.

[Proposal 1-2]

In the case of the power headroom report for the additional SRS, a method may be considered in which a Type 4 power headroom report is newly configured and the UE reports the PH by utilizing the newly configured Type 4 power headroom report.

Even in this case, the calculation equation for the type 3 PH may be utilized for the PH calculation for the additional SRS (parameters such as $P_{O\_SRS,c}(l)$, $\alpha_{SRS,c}$, $f_{SRS,c}(i)$, etc., may be applied as the parameters of the additional SRS other than the parameters of the SRS of the PUSCH-less SCell).

In this case, the container for PH type 4 of the MAC PDU for the PH report for the additional SRS may be newly added upon the report through the timer of the UE and the PH report which is based on the specific condition. The UE may report the PH for the additional SRS by utilizing the octet of the corresponding MAC PDU. Accordingly, the PH report for the additional SRS of the PCell and the SCell (with PUSCH) is enabled apart from the PH report for the SRS of the PUSCH-less SCell, and as a result, a more flexible configuration is enabled than the configuration in Proposal 1-1.

In the case of Proposal 1-2, for an additional SRS having a separate power control process from the legacy SRS or the SRS of the PUSCH-less SCell in the open-loop and closed-loop power control, the UE may also perform the PH report according to a separate process. As a result, the BS may separately recognize which degree the PH for the additional SRS is.

The effects according to Proposal 1-2 described above are as follows.

For example, if FDM based transmission with other UL channels is possible when the additional SRS is in a single cell, the BS may acquire PH information of the additional SRS in addition to PH information of other UL channels (e.g., PUSCH, PUCCH, etc.), and then configure/indicate whether FDM transmission is performed by considering a power capacity of the UE.

Further, for example, if the FDM transmission or transmission in the same symbol is possible between the SRS and other UL channels over multi cells even in multi cells or CA situations, the BS may acquire the PH information of the additional SRS in addition to the PH information of other UL channels (e.g., PUSCH, PUCCH, etc.), and then judge whether simultaneous transmissions of the SRS and other UL channels is configured/indicated by considering a power capacity in the CA situation of the UE.

Hereinafter, the operation of the UE which is based on Method 1, Method 2, etc., may be expressed as in the following example.

<UE Operation of Method 1>

Step 0) The SRS configuration may be received from the BS as in Method 1/Method 2, etc.

Step 0-1) A configuration for transmitting the SRS, and a configuration for a power control and the PHR may be received in one or more symbols.

Step 0-1-1) Information (36.331 SoundingRS-UL-Config or/and TPC-PDCCH-Config or/and SRS-TPC-PDCCH-Config etc.) which may be included in the configuration Step 0-2) The SRS configuration may include SRS related information transmitted periodically and/or aperiodically.

Step 0-3) A power adjustment indication may be received from the BS through the TPC command such as DCI format 3B before SRS transmission.

Step 1) When SRS trigger is received through UL/DL grant (through PDCCH) or when an RRC configuration based SRS transmission timing arrives Step 1-1) SRS transmission for SRS transmittable resource <UE Operation of Method 2>

Step 0) A PHR related configuration may be received from the BS as in Method 2, etc. (e.g., see TS 36.331 for periodicPHR-Timer and/or prohibitPHR-Timer, dl-Pathloss-Change).

Step 1) Whether PHR reporting trigger based on a PHR related timer (periodicPHR-Timer and/or prohibitPHR-Timer in 36.331/36.321) is performed or whether PHR reporting trigger based on a specific condition (e.g., when a pathloss value for an RS configured in an (open loop) power control process is changed to a specific value (a specific threshold, e.g., dl-PathlossChange in 36.331/36.321)) may be confirmed/determined Step 2) When PHR reporting is triggered by Step 0, the MAC-CE including the power headroom report for the additional SRS of the UE may be transmitted to the BS through the MAC PDU/PUSCH as in Method 2. In this case, the UE Step 2-1) may transmit, to the BS, the MAC-CE including the type 3 PH report according to the higher layer configuration configured by the BS (received in Step 0) as in Proposal 1-1.

or,

Step 2-2) as in Proposal 1-2 of Method 2, the MAC-CE including the type 4 PH report may be transmitted to the BS through the MAC PDU/PUSCH.

All of the steps are not required, and some steps may be omitted according to the situation of the UE.

In terms of implementation, the operations of the BS/UE according to the above-described embodiments (e.g., the operations related to the transmission of the additional SRS based on at least one of Method 1 (Proposals 1, 1-1, and 1-2)/Method 2 (Proposals 1, 1-1, and 1-2)) may be processed by devices (e.g., processors 102 and 202 in FIG. 17) in FIGS. 16 to 20 to be described below.

Further, the operations of the BS/UE according to the above-described embodiments (e.g., the operations related to the transmission of the additional SRS based on at least one of Method 1 (Proposals 1, 1-1, and 1-2)/Method 2 (Proposals 1, 1-1, and 1-2)) may also be stored in a memory (e.g., the memories 104 and 204 in FIG. 17) in the form of a command/program (e.g., an instruction or an executable code) for driving at least one processor (e.g., reference numerals 102 or 202 in FIG. 17).

Respective examples of operation flows of the BS and the UE for the above-described proposed method (e.g., Proposal 1/Proposal 1-1/Proposal 1-2 of Method 1/Proposal 1/Proposal 1-1/Proposal 1-2 of Method 2) may be illustrated in FIG. 11/FIG. 12/FIG. 13. FIG. 11/FIG. 12/FIG. 13 is just for convenience of the description and does not limit the scope of the embodiment of the present disclosure. Further, some of steps described in FIG. 11/FIG. 12/FIG. 13 may also be merged or omitted. Further, in performing procedures to be described below, LTE related contents and SRS related contents/power headroom report related contents according to FIGS. 1 to 8 described above may be considered/applied.

FIG. 11 illustrates a method for receiving, by a base station, an SRS according to an embodiment of the present disclosure. Specifically, FIG. 11 is a flowchart for describing the operation of the BS based on Method 1.

The BS may transmit, to the UE, an SRS configuration through a higher layer (e.g., RRC or MAC CE). For example, the SRS configuration may include information related to an SRS (e.g., additional SRS and UpPts SRS) based on the above-described proposed method (e.g., Proposal 1/Proposal 1-1/Proposal 1-2 of Method 1). As an example, the SRS configuration may include SRS related information transmitted periodically and/or aperiodically. As an example, the SRS configuration may include a configuration for transmitting the SRS and a configuration for a power control and a PHR in one or more symbols. As an example, the SRS configuration may include information on a cell to which an additional SRS TPC is to be applied. As an example, information which may be included in the SRS configuration may be based on TS36.331 SoundingRS-UL-Config or/and TPC-PDCCH-Config or/and SRS-TPC-PDCCH-Config etc.

For example, a operation of the BS (reference numeral 100/200 in FIGS. 16 to 20) which transmits the SRS configuration to the UE (reference numeral 100/200 in FIGS. 16 to 20) may be implemented by devices in FIGS. 16 to 20 to be described below. For example, referring to FIG. 17, one or more processors 202 may control one or more transceivers 206 and/or one or more memories 204 so as to transmit the SRS configuration, and one or more transceivers 206 may transmit, to the UE, the SRS configuration.

The BS may transmit DCI to the UE (S1120). For example, the DCI may include information related to transmission of an SRS and/or a UL channel. For example, the DCI may correspond to DCI format 3B and a power adjustment indication may be performed through a TPC command included in the DCI, as in Method 1 described above. As an example, the DCI may include information for triggering the SRS. Alternatively, as an example, the information related to the transmission of the SRS and/or the UL channel may also be included in the SRS configuration in step S1110 described above.

For example, a operation of the BS (reference numeral 100/200 in FIGS. 16 to 20) which transmits the DCI to the UE (reference numeral 100/200 in FIGS. 16 to 20) in step S1120 described above may be implemented by the devices in FIGS. 16 to 20 to be described below. For example, referring to FIG. 17, one or more processors 202 may control one or more transceivers 206 and/or one or more memories 204 so as to transmit the DCI and one or more transceivers 206 may transmit the DCI to the UE.

The BS may receive, from the UE, the SRS/UL channel (S1130). For example, the BS may receive the SRS/UL channel transmitted from the UE based on the above-described proposed method (e.g., Proposal 1/Proposal 1-1/Proposal 1-2 of Method 1, etc.). For example, the SRS/UL channel may be transmitted based on a configuration/DCI for the above-described SRS configuration/power control/PHR. And/or, for example, the SRS/UL channel may be transmitted based on a pre-defined rule (e.g., a gap symbol location/an SRS symbol location/SRS symbol indexing, etc.). And/or, for example, in the case of multi symbol SRS transmission, a resource configured based on the above-described proposed method (e.g., a gap symbol location/an SRS symbol location/SRS symbol indexing, etc.) may be transmitted.

For example, a operation of the BS (reference numeral 100/200 in FIGS. 16 to 20) which receives the SRS/UL channel from the UE (reference numeral 100/200 in FIGS. 16 to 20) in step S1130 described above may be implemented by the devices in FIGS. 16 to 20 to be described below. For example, referring to FIG. 17, one or more processors 202 may control one or more transceivers 206 and/or one or more memories 204 to receive the SRS/UL channel, and one or more transceivers 206 may receive the SRS/UL channel from the UE.

FIG. 12 illustrates a method for transmitting, by a UE, an SRS according to an embodiment of the present disclosure. Specifically, FIG. 12 is a flowchart for describing the operation of the BS based on Method 1.

The UE may receive, from the BS, an SRS configuration through a higher layer (e.g., RRC or MAC CE) (S1210). For example, the SRS configuration may include information related to an SRS (e.g., additional SRS and UpPts SRS) based on the above-described proposed method (e.g., Proposal 1/Proposal 1-1/Proposal 1-2 of Method 1, etc.). As an example, the SRS configuration may include SRS related information transmitted periodically and/or aperiodically. As an example, the SRS configuration may include a configuration for transmitting the SRS/power control related information/a configuration for a PHR in one or more symbols. As an example, the SRS configuration may include information (e.g., a period/offset, etc.) related to an SRS transmission timing. As an example, the SRS configuration may include information on a cell to which an additional SRS TPC is to be applied. As an example, information which may be included in the SRS configuration may be based on TS 36.331 SoundingRS-UL-Config or/and TPC-PDCCH-Config or/and SRS-TPC-PDCCH-Config, etc.

For example, a operation of the UE (reference numeral 100/200 in FIGS. 16 to 20) which receives the SRS configuration from the BS (reference numeral 100/200 in FIGS. 16 to 20) may be implemented by the devices in FIGS. 16 to 20 to be described below. For example, referring to FIG. 17, one or more processors 102 may control one or more transceivers 106 and/or one or more memories 104 so as to receive the SRS configuration, and one or more transceivers 106 may receive, to the BS, the SRS configuration.

The UE may receive DCI from the BS (S1220). For example, the DCI may include information related to transmission of an SRS and/or a UL channel. For example, the DCI may correspond to DCI format 3B and a power adjustment indication may be received through a TPC command included in the DCI, as in Method 1 described above. As an example, the DCI may include information for triggering the SRS. Alternatively, as an example, the information related to the transmission of the SRS and/or the UL channel may also be included in the SRS configuration in step S1210 described above.

For example, a operation of the UE (reference numeral 100/200 in FIGS. 16 to 20) which receives the DCI from the BS (reference numeral 100/200 in FIGS. 16 to 20) in step S1220 described above may be implemented by the devices in FIGS. 16 to 20 to be described below. For example, referring to FIG. 17, one or more processors 102 may control one or more transceivers 106 and/or one or more memories 104 so as to receive the DCI, and one or more transceivers 106 may receive the DCI from the BS.

The UE may transmit, to the BS, the SRS/UL channel (S1230). For example, the UE may transmit the SRS/UL channel transmitted to the BS based on the above-described proposed method (e.g., Proposal 1/Proposal 1-1/Proposal 1-2 of Method 1, etc.). For example, the SRS/UL channel may be transmitted based on a configuration/DCI for the above-described SRS configuration/power control/PHR. And/or, for example, the SRS/UL channel may be transmitted based on a pre-defined rule (e.g., a gap symbol location/an SRS symbol location/SRS symbol indexing, etc.). And/or, for example, in the case of multi symbol SRS transmission, a resource configured based on the above-described proposed method (e.g., a gap symbol location/an SRS symbol location/SRS symbol indexing, etc.) may be transmitted.

For example, a operation of the UE (reference numeral 100/200 in FIGS. 16 to 20) which transmits the SRS/UL channel to the BS (reference numeral 100/200 in FIGS. 16 to 20) in step S1230 described above may be implemented by the devices in FIGS. 16 to 20 to be described below. For example, referring to FIG. 17, one or more processors 102 may control one or more transceivers 106 and/or one or more memories 104 to transmit the SRS/UL channel, and one or more transceivers 106 may transmit the SRS/UL channel to the BS.

FIG. 13 illustrates a method for reporting, by a UE, a power headroom according to an embodiment of the present disclosure. Specifically, FIG. 13 is a flowchart for describing the operation of the UE based on Method 2/Method 3.

The UE may receive, from the BS, a PHR related configuration (S1310). For example, the PHR related configuration may be received through a higher layer (e.g., RRC or MAC CE). For example, the PHR related configuration may include a specific value (specific threshold) related to a PHR related timer/pathloss value based on the above-described proposed method (e.g., Proposal 1/Proposal 1-1/Proposal 1-2 of Method 2, etc.). As an ex ample, information which may be included in the PHR related configuration may be based on TS36.331 periodicPHR-Timer and/or prohibitPHR-Timer/dl-PathlossChange, etc.

For example, a operation of the UE (reference numeral 100/200 in FIGS. 16 to 20) which receives the PHR related configuration from the BS (reference numeral 100/200 in FIGS. 16 to 20) in step S1310 may be implemented by the devices in FIGS. 16 to 20 to be described below. For example, referring to FIG. 17, one or more processors 102 may control one or more transceivers 106 and/or one or more memories 104 so as to receive the PHR related configuration, and one or more transceivers 106 may receive, from the BS, the PHR related configuration.

The UE may confirm/determine whether a report for the PHR is triggered (S1320). For example, whether the report for the PHR is triggered may be confirmed/determined based on the PHR related configuration. As an example, whether PHR reporting trigger based on a PHR related timer (periodicPHR-Timer and/or prohibitPHR-Timer in 36.331/36.321) is performed or whether PHR reporting trigger based on a specific condition (e.g., when a pathloss value for an RS configured in an (open loop) power control process is changed to a specific value (a specific threshold, e.g., dl-PathlossChange in 36.331/36.321)) may be confirmed/determined.

For example, a operation of the UE (reference numeral 100/200 in FIGS. 16 to 20) which confirms/determines whether the PHR reporting triggering is performed in step S1320 described above may be implemented by the devices in FIGS. 16 to 20 to be described below. For example, referring to FIG. 17, one or more processors 102 may control one or more transceiver 106 and/or one or more memories 104 to confirm/determine whether the PHR reporting triggering is performed.

The UE may report/transmit, to the BS, a power headroom report (PHR). For example, the UE may report/transmit, to the BS, the PHR based on the above-described proposed method (e.g., Proposal 1/Proposal 1-1/Proposal 1-2 of Method 2, etc.). For example, the PHR may be included in the UL channel and transmitted upon transmitting the SRS/UL channel. For example, when the PHR reporting is triggered, the UE may transmit, to the BS, the MAC-CE including the PHR for the additional SRS through the MAC PDU/PUSCH as in Method 2 described above. For example, the UE may transmit, to the BS, the SRS (e.g., the additional SRS)/the UL channel (e.g., the UL channel including the PHR for the additional SRS) as in Proposed Method 2 described above. As an example, the PHR may correspond to type 3 or type 4.

For example, a operation of the UE (100/200 in FIGS. 16 to 20) which reports/transmits the power headroom report (PHR) to the BS (100/200 in FIGS. 16 to 20) in step S1330 described above may be implemented by the devices in FIGS. 16 to 20 to be described below. For example, referring to FIG. 17, one or more processors 102 may control one or more transceivers 106 and/or one or more memories 104 so as to report/transmit the power headroom report (PHR) and one or more transceivers 106 may report/transmit the PHR to the BS.

As mentioned above, the BS/UE operation (e.g., Proposal 1/Proposal 1-1/Proposal 1-2 of Method 1/Proposal 1-1/Proposal 1-2 of Method 2/FIG. 11/FIG. 12/FIG. 13, etc.) may be implemented by the devices (e.g., FIGS. 16 to 20) to be described below. For example, the UE may correspond to a first wireless device and the BS may correspond to a second wireless device and in some cases, an opposite case thereto may also be considered.

For example, the above-described BS/UE operation (e.g., Proposal 1/Proposal 1-1/Proposal 1-2 of Method 1/Proposal 1/Proposal 1-1/Proposal 1-2 of Method 2/Proposal 1/Proposal 2/Proposal 3 of Method 3/FIG. 11/FIG. 12/FIG. 13, etc.) may be processed by one or more processors (e.g., 102 and 202) in FIGS. 16 to 20, and the above-described BS/UE operation (e.g., Proposal 1/Proposal 1-1/Proposal 1-2 of Method 1/Proposal 1/Proposal 1-1/Proposal 1-2 of Method 2/FIG. 11/FIG. 12/FIG. 13, etc.) may also be stored in a memory (e.g., one or more memories (e.g., 104 and 204 in FIG. 20) in a form of a command/program (e.g., instruction and executable code) for driving at least one processor (e.g., 102 and 202) in FIGS. 16 to 20.

Hereinafter, the above-described embodiments will be described in detail with reference to FIG. 14 in terms of the operation of the UE. Methods to be described below are just distinguished for convenience and it is needless to say that some components of any one method may be substituted with some components of another method or may be applied in combination with each other.

FIG. 14 is a flowchart for describing a method of transmitting, by a UE, a sounding reference signal in a wireless communication system according to an embodiment of the present disclosure.

Referring to FIG. 14, a method for transmitting, by a UE, a sounding reference signal (SRS) in a wireless communication system according to an embodiment of the present disclosure includes: receiving SRS configuration information (S1410); transmitting a message including information on a power headroom (PH) (S1420); receiving DCI for triggering an SRS (S1430); and transmitting the SRS (S1440).

In S1410, the UE receives, from the BS, the configuration information related to the transmission of the SRS. The SRS may be an additional SRS. Specifically, the SRS may be configured in a region consisting of at least one symbol other than a last symbol of a subframe.

According to S1410 described above, a operation of the UE (100/200 in FIGS. 16 to 20) which receives, from the BS (100/200 in FIGS. 16 to 20), the configuration information related to the transmission of the SRS may be implemented by the devices in FIGS. 16 to 20. For example, referring to FIG. 17, one or more processors 102 may control one or more transceivers 106 and/or one or more memories 104 so as to receive, from the BS 200, the configuration information related to the transmission of the SRS.

In S1420, the UE transmits a message including information on a power headroom (PH) related to transmission power of the SRS.

According to an embodiment, the PH may be related to a power headroom report (PHR) of a specific type. The embodiment may be based on Proposal 1-1 of Method 2 above.

The specific type may be based on a type of a power headroom report for a serving cell in which a physical uplink shared channel (PUSCH) and a physical uplink control channel (PUCCH) are not configured.

According to an embodiment, the message may be based on a power headroom report (PHR) MAC CE. The PH may be a Type 3 PH.

According to an embodiment, when the message is transmitted based on a pre-configured timer or trigger condition, a target for acquiring the PH may be determined based on configuration information for reporting the Type 3 PH.

The target for acquiring the PH may be i) the SRS or ii) an SRS in a secondary cell (SCell) in which a physical uplink shared channel (PUSCH) and a physical uplink control channel (PUCCH) are not configured.

The configuration information for reporting the Type 3 PH may be configured through a higher layer.

According to S1420 described above, a operation of the UE (100/200 in FIGS. 16 to 20) which transmits, to the BS (100/200 in FIGS. 16 to 20), a message including information on a power headroom (PH) related to transmission power of the SRS may be implemented by the devices in FIGS. 16 to 20. For example, referring to FIG. 17, one or more processors 102 may control one or more transceivers 106 and/or one or more memories 104 so as to transmit, to the BS 200, the message including the information on the power headroom (PH) related to the transmission power of the SRS.

In step S1430, the UE receives, from the BS, downlink control information (DCI) for triggering the transmission of the SRS.

According to an embodiment, the DCI may include a transmission power control (TPC) command related to control of the transmission power of the SRS. However, the TPC command may be transmitted while being included in another DCI other than the DCI for triggering the transmission of the SRS.

According to an embodiment, the TPC command may be acquired based on blind detection related to downlink control information (DCI). The blind detection may be performed based on a plurality of RNTIs related to the TPC. The embodiment may be based on Proposal 1-2 of Method 1 above.

The plurality of RNTIs related to the TPC may include first RNTI and second RNTI. The TPC command may be acquired through the blind detection based on the second RNTI. The second RNTI may be based on RNTI pre-configured for the additional SRS. As an example, the second RNTI may be the above-described srs-TPC-RNTI-additionalSRS.

The first RNTI may be legacy RNTI related to the TPC. As an example, the first RNTI may be based on srs-TPC-RNTI. The TPC command for the SRS in the secondary cell (SCell) in which the physical uplink shared channel (PUSCH) and the physical uplink control channel (PUCCH) are not configured may be acquired through the blind detection based on the srs-TPC-RNTI.

According to S1430 described above, a operation of the UE (100/200 in FIGS. 16 to 20) which receives downlink control information (DCI) for triggering the transmission of the SRS from the BS (100/200 in FIGS. 16 to 20) may be implemented by the devices in FIGS. 16 to 20. For example, referring to FIG. 17, one or more processors 102 may control one or more transceivers 106 and/or one or more memories 104 so as to receive the downlink control information (DCI) for triggering the transmission of the SRS from the BS 200.

In S1440, the UE transmits the SRS to the BS. The SRS is transmitted with transmission power based on a transmission power control (TPC) command related to control of the transmission power. The transmission power based on the TPC command may be determined as described above in a UE operation for SRS power control.

According to S1440 described above, an operation of the UE (100/200 in FIGS. 16 to 20) which transmits, to the BS (100/200 in FIGS. 16 to 20), the SRS may be implemented by the devices in FIGS. 16 to 20. For example, referring to FIG. 17, one or more processors 102 may control one or more transceivers 106 and/or one or more memories 104 so as to transmit, to the BS 200, the SRS.

Hereinafter, the above-described embodiments will be described in detail with reference to FIG. 15 in terms of the operation of the BS. Methods to be described below are just distinguished for convenience and it is needless to say that some components of any one method may be substituted with some components of another method or may be applied in combination with each other.

FIG. 15 is a flowchart for describing a method for receiving, by a BS, a sounding reference signal in a wireless communication system according to another embodiment of the present disclosure.

Referring to FIG. 15, a method for receiving, by a BS, a sounding reference signal (SRS) in a wireless communication system according to another embodiment of the present disclosure includes: transmitting SRS configuration information (S1510); receiving a message including information on a power headroom (S1520); transmitting DCI for triggering the SRS (S1530); and receiving the SRS (S1540).

In S1510, the BS transmits, to the UE, the configuration information related to the transmission of the SRS. The SRS may be an additional SRS. Specifically, the SRS may be configured in a region consisting of at least one symbol other than a last symbol of a subframe.

According to S1510 described above, a operation of the BS (100/200 in FIGS. 16 to 20) which transmits, to the UE (100/200 in FIGS. 16 to 20), the configuration information related to the transmission of the SRS may be implemented by the devices in FIGS. 16 to 20. For example, referring to FIG. 17, one or more processors 202 may control one or more transceivers 206 and/or one or more memories 204 so as to transmit, to the UE 100, the configuration information related to the transmission of the SRS.

In S1520, the BS receives, from the UE, the message including the information on the power headroom (PH) related to the transmission power of the SRS.

According to an embodiment, the PH may be related to a power headroom report (PHR) of a specific type. The embodiment may be based on Proposal 1-1 of Method 2 above.

The specific type may be based on a type of a power headroom report for a serving cell in which a physical uplink shared channel (PUSCH) and a physical uplink control channel (PUCCH) are not configured.

According to an embodiment, the message may be based on a power headroom report (PHR) MAC CE. The PH may be a Type 3 PH.

According to an embodiment, when the message is transmitted based on a pre-configured timer or trigger condition, a target for acquiring the PH may be determined based on configuration information for reporting the Type 3 PH.

The target for acquiring the PH may be i) the SRS or ii) an SRS in a secondary cell (SCell) in which a physical uplink shared channel (PUSCH) and a physical uplink control channel (PUCCH) are not configured.

The configuration information for reporting the Type 3 PH may be configured through a higher layer.

According to S1520 described above, a operation of the BS (100/200 in FIGS. 16 to 20) which receives, from the UE (100/200 in FIGS. 16 to 20), a message including information on a power headroom (PH) related to transmission power of the SRS may be implemented by the devices in FIGS. 16 to 20. For example, referring to FIG. 17, one or more processors 202 may control one or more transceivers 206 and/or one or more memories 204 so as to receive, from the UE 100, the message including the information on the power headroom (PH) related to the transmission power of the SRS.

In step S1530, the BS transmits, to the UE, downlink control information (DCI) for triggering the transmission of the SRS.

According to an embodiment, the DCI may include a transmission power control (TPC) command related to control of the transmission power of the SRS. However, the TPC command may be transmitted while being included in another DCI other than the DCI for triggering the transmission of the SRS.

According to an embodiment, the TPC command may be acquired based on blind detection related to downlink control information (DCI). The blind detection may be performed based on a plurality of RNTIs related to the TPC. The embodiment may be based on Proposal 1-2 of Method 1 above.

The plurality of RNTIs related to the TPC may include first RNTI and second RNTI. The TPC command may be acquired through the blind detection based on the second RNTI. The second RNTI may be based on RNTI pre-configured for the additional SRS. As an example, the second RNTI may be the above-described srs-TPC-RNTI-additionalSRS.

The first RNTI may be legacy RNTI related to the TPC. As an example, the first RNTI may be based on srs-TPC-RNTI. The TPC command for the SRS in the secondary cell (SCell) in which the physical uplink shared channel (PUSCH) and the physical uplink control channel (PUCCH) are not configured may be acquired through the blind detection based on the srs-TPC-RNTI.

According to S1530 described above, a operation of the BS (100/200 in FIGS. 16 to 20) which transmits downlink control information (DCI) for triggering the transmission of the SRS to the UE (100/200 in FIGS. 16 to 20) may be implemented by the devices in FIGS. 16 to 20. For example, referring to FIG. 17, one or more processors 202 may control one or more transceivers 206 and/or one or more memories 204 so as to transmit the downlink control information (DCI) for triggering the transmission of the SRS to the UE 100.

In S1540, the BS receives the SRS from the UE. The SRS is transmitted with transmission power based on a transmission power control (TPC) command related to control of the transmission power. The transmission power based on the TPC command may be determined as described above in a BS operation for SRS power control.

According to S1540 described above, a operation of the BS (100/200 in FIGS. 16 to 20) which receives, from the UE (100/200 in FIGS. 16 to 20), the SRS may be implemented by the devices in FIGS. 16 to 20. For example, referring to FIG. 17, one or more processors 202 may control one or more transceivers 206 and/or one or more memories 204 so as to receive, from the UE 100, the SRS.

Example of Communication System Applied to Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 16 illustrates a communication system 1 applied to the disclosure.

Referring to FIG. 16, a communication system 1 applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Example of Wireless Device Applied to the Disclosure

FIG. 17 illustrates wireless devices applicable to the disclosure.

Referring to FIG. 17, a first wireless device 100 and a second wireless device 200 may transmit radio signals through a variety of RATs (e.g., LTE and NR). Herein, the first wireless device 100 and the second wireless device 200 may correspond to the wireless device 100x and the BS 200 and/or the wireless device 100x and the wireless device 100x of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Disclosure

FIG. 18 illustrates a signal process circuit for a transmission signal.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Disclosure

FIG. 19 illustrates another example of a wireless device applied to the disclosure.

The wireless device may be implemented in various forms according to a use-case/service (refer to FIG. 16). Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a Fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM), a flash memory, a volatile memory, a non-volatile memory, and/or a combination thereof.

Example of Hand-Held Device Applied to the Disclosure

FIG. 20 illustrates a hand-held device applied to the disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of the method and the device for transmitting and receiving the SRS in the wireless communication system according to the embodiment of the present disclosure are described below.

According to an embodiment of the present disclosure, a message including information on a power headroom (PH) related to transmission power of the SRS is transmitted. The PH is related to a specific type of power headroom report, and the specific type is based on a type of a power headroom report for a serving cell in which a physical uplink shared channel (PUSCH) and a physical uplink control channel (PUCCH) are not configured.

A power headroom report of an additional SRS can be performed based on a legacy Type 3 scheme. Accordingly, independent power control from a legacy SRS can be performed for the additional SRS without exerting another influence on a legacy power headroom report operation.

Here, wireless communication technology implemented in wireless devices 100 and 200 of FIG. 17 of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100 and 200 of FIG. 17 of the present disclosure may perform communication based on LTE-M technology. In this case, as an example, the LTE-M technology may be an example of the LPWAN and may be called various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. Additionally or alternatively, the wireless communication technology implemented in the wireless devices 100 and 200 of FIG. 17 of the present disclosure may include at least one of ZigBee, Bluetooth, and Low Power Wide Area Network (LPWAN) considering the low-power communication, and is not limited to the name described above. As an example, the ZigBee technology may generate personal area networks (PAN) associated with small/low-power digital communication based on various standards including IEEE 802.15.4, and the like, and may be called various names.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the disclosure should be determined by reasonable interpretations of the appended claims and all equivalents of the disclosure belong to the scope of the disclosure.

The invention claimed is:

1. A method for transmitting, by a user equipment (UE), a sounding reference signal (SRS) in a wireless communication system, the method comprising:
receiving configuration information of the SRS;
transmitting a message including information on a power headroom (PH) related to transmission power of the SRS;
receiving downlink control information (DCI) for triggering the transmission of the SRS; and
transmitting the SRS,
wherein the SRS is transmitted with transmission power based on a transmission power control (TPC) command,
wherein the SRS is a first SRS configured in a normal UL subframe which is not a special subframe,
wherein the first SRS is configured in one or more symbols other than a last symbol of the normal UL subframe, and a second SRS is configured in the last symbol of the normal UL subframe,
wherein a PH related to transmission power of the second SRS is reported only for a pre-defined serving cell, as a Type 3 PH,
wherein the pre-defined serving cell is a Secondary Cell (SCell) in which a physical uplink shared channel (PUSCH) and a physical uplink control channel (PUCCH) are not configured,
wherein a PH related to transmission power of the first SRS is reported, for a serving cell in which the first SRS is configured, as the Type 3 PH through the message,
wherein the serving cell in which the first SRS is configured includes at least one of i) the pre-defined serving cell and/or ii) an other serving cell, and
wherein the other serving cell includes a Primary Cell (PCell).

2. The method of claim 1, wherein the message is based on power headroom report (PHR) MAC CE.

3. The method of claim 1, wherein the other serving cell includes at least one of i) the PCell, ii) an SCell in which the PUCCH is configured or iii) an SCell in which the PUSCH is configured.

4. The method of claim 1, wherein, based on that the message is transmitted based on a pre-configured timer or trigger condition, a target for acquiring the PH is determined based on configuration information for reporting the Type 3 PH.

5. The method of claim 4, wherein the target for acquiring the PH is i) the first SRS or ii) the second SRS in the SCell.

6. The method of claim 4, wherein the configuration information for reporting the Type 3 PH is configured through a higher layer.

7. The method of claim 1, wherein the TPC command is acquired based on blind detection related to downlink control information (DCI), and wherein the blind detection is performed based on a plurality of RNTIs related to TPC.

8. The method of claim 7, wherein the plurality of RNTIs related to the TPC includes first RNTI and second RNTI, and
wherein the TPC command is acquired through the blind detection based on the second RNTI.

9. The method of claim 8, wherein the first RNTI is based on srs-TPC-RNTI, and
wherein the TPC command for the second SRS in the SCell is acquired through the blind detection based on the srs-TPC-RNTI.

10. The method of claim 1, wherein the special subframe includes one or more symbols in which the second SRS is additionally configured,
wherein the one or more symbols in the special subframe are based on an Uplink Pilot Time Slot (UpPTS).

11. A user equipment (UE) for transmitting a sounding reference signal (SRS) in a wireless communication system, the UE comprising:
one or more transceivers;
one or more processors controlling the one or more transceivers; and
one or more memories operatively connectable to the one or more processors, and storing instructions, based on being executed by the one or more processors, performing operations,
wherein the operations include
receiving configuration information of the SRS,
transmitting a message including information on a power headroom (PH) related to transmission power of the SRS,
receiving downlink control information (DCI) for triggering the transmission of the SRS, and
transmitting the SRS,
wherein the SRS is transmitted with transmission power based on a transmission power control (TPC) command,
wherein the SRS is a first SRS configured in a normal UL subframe which is not a special subframe,
wherein the first SRS is configured in one or more symbols other than a last symbol of the normal UL subframe, and a second SRS is configured in the last symbol of the normal UL subframe,
wherein a PH related to transmission power of the second SRS is reported only for a pre-defined serving cell, as a Type 3 PH,
wherein the pre-defined serving cell is a Secondary Cell (SCell) in which a physical uplink shared channel (PUSCH) and a physical uplink control channel (PUCCH) are not configured,
wherein a PH related to transmission power of the first SRS is reported, for a serving cell in which the first SRS is configured, as the Type 3 PH through the message,
wherein the serving cell in which the first SRS is configured includes at least one of i) the pre-defined serving cell and/or ii) an other serving cell, and
wherein the other serving cell includes a Primary Cell (PCell).

12. The UE of claim 11, wherein the message is based on power headroom report (PHR) MAC CE.

13. A base station (BS) for receiving a sounding reference signal (SRS) in a wireless communication system, the BS comprising:
one or more transceivers;
one or more processors controlling the one or more transceivers; and one or more memories operatively connectable to the one or more processors, and storing instructions, based on being executed by the one or more processors, performing operations, wherein the operations include transmitting configuration information of the sounding reference signal (SRS), receiving a message including information on a power headroom (PH) related to transmission power of the SRS, transmitting downlink control information (DCI) for triggering the transmission of the SRS, and receiving the SRS, wherein the SRS is transmitted with transmission power based on a transmission power control (TPC) command related to control of transmission power, wherein the SRS is a first SRS configured in a normal UL subframe which is not a special subframe, wherein the first SRS is configured in one or more symbols other than a last symbol of the normal UL subframe, and a second SRS is configured in the last symbol of the normal UL subframe, wherein, only for a pre-defined serving cell, a PH related to transmission power of the second SRS is received as a Type 3 PH, wherein the pre-defined serving cell is a Secondary Cell (SCell) in which a physical uplink shared channel (PUSCH) and a physical uplink control channel (PUCCH) are not configured, wherein, for a serving cell in which the first SRS is configured, a PH related to transmission power of the first SRS is received as the Type 3 PH through the message, wherein the serving cell in which the first SRS is configured includes at least one of i) the pre-defined serving cell and/or ii) an other serving cell, and wherein the other serving cell includes a Primary Cell (PCell).

* * * * *